US012033373B2

(12) United States Patent
Gibbon et al.

(10) Patent No.: US 12,033,373 B2
(45) Date of Patent: Jul. 9, 2024

(54) DYNAMIC IMAGE RECOGNITION MODEL UPDATES

(71) Applicant: HYUNDAI MOTOR COMPANY and KIA CORPORATION, Seoul (KR)

(72) Inventors: David Crawford Gibbon, Lincroft, NJ (US); Zhu Liu, Marlboro, NJ (US); Eric Zavesky, Austin, TX (US); Benjamin J. Stern, Morris Township, NJ (US)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 128 days.

(21) Appl. No.: 17/490,709

(22) Filed: Sep. 30, 2021

(65) Prior Publication Data

US 2022/0020127 A1  Jan. 20, 2022

Related U.S. Application Data

(60) Division of application No. 16/132,802, filed on Sep. 17, 2018, now Pat. No. 11,164,294, which is a
(Continued)

(51) Int. Cl.
*G06V 10/772* (2022.01)
*G06F 18/28* (2023.01)
(Continued)

(52) U.S. Cl.
CPC .......... *G06V 10/772* (2022.01); *G06F 18/28* (2023.01); *G06T 5/92* (2024.01); *G06V 20/10* (2022.01);
(Continued)

(58) Field of Classification Search
CPC .... G06V 10/772; G06V 40/172; G06V 40/16; G06F 18/28; G06T 5/009; G06T 2207/20208; G06K 2207/1012
See application file for complete search history.

(56) References Cited

U.S. PATENT DOCUMENTS 5,559,925 A  9/1996 Austin
6,714,665 B1  3/2004 Hanna et al.
(Continued)

FOREIGN PATENT DOCUMENTS

CN  101179789 A  5/2008
EP  2656279 A2  10/2013
(Continued)

OTHER PUBLICATIONS

DeBoer (Label Placement in 3D Georeferenced and Oriented Digital Photograps using GIS Technology, Delft University of Technology, Dec. 2007) (Year: 2007).*
(Continued)

*Primary Examiner* — Mark Roz
(74) *Attorney, Agent, or Firm* — MORGAN, LEWIS & BOCKIUS LLP

(57) ABSTRACT

Aspects of the subject disclosure may include, for example, receiving first image data for a first image from an electronic device, the first image data including first information associated with a first object identified by the electronic device as being in the first image. Second image data for a second image is received from the electronic device subsequent to receiving the first image data. The second image data includes second information associated with a second object identified by the electronic device as being in the second image. Location information is determined based on the first information and the second information and sent to the electronic device. Other embodiments are disclosed.

13 Claims, 9 Drawing Sheets

Related U.S. Application Data continuation of application No. 14/561,353, filed on Dec. 5, 2014, now Pat. No. 10,115,185.

(51) Int. Cl.
   *G06T 5/92* (2024.01)
   *G06V 20/10* (2022.01)
   *G06V 40/16* (2022.01)

(52) U.S. Cl.
   CPC ............ *G06V 40/16* (2022.01); *G06V 40/172* (2022.01); *G06K 2207/1012* (2013.01); *G06T 2207/20208* (2013.01)

(56) References Cited

U.S. PATENT DOCUMENTS

| | | | |
|---|---|---|---|
| 7,643,056 | B2 | 1/2010 | Silsby |
| 8,392,957 | B2 | 3/2013 | Holt et al. |
| 8,627,096 | B2 | 1/2014 | Azar et al. |
| 8,704,906 | B2 | 4/2014 | Yamamoto |
| 8,768,313 | B2 | 7/2014 | Rodriguez |
| 2005/0099220 | A1 | 5/2005 | Sato |
| 2007/0005988 | A1 | 1/2007 | Zhang et al. |
| 2009/0175509 | A1 | 7/2009 | Gonion et al. |
| 2010/0260373 | A1 | 10/2010 | Neven |
| 2012/0007713 | A1 | 1/2012 | Nasiri et al. |
| 2012/0230539 | A1 | 9/2012 | Calman et al. |
| 2012/0242842 | A1* | 9/2012 | Yoshigahara ........ G06V 30/142 348/207.1 |
| 2013/0050507 | A1* | 2/2013 | Syed .................. H04N 1/00244 348/207.1 |
| 2013/0182918 | A1 | 7/2013 | Kovtun et al. |
| 2013/0223696 | A1 | 8/2013 | Azar et al. |
| 2014/0049362 | A1 | 2/2014 | Ahearn et al. |
| 2014/0132508 | A1 | 5/2014 | Hodge et al. |
| 2014/0160016 | A1 | 6/2014 | Katz |
| 2014/0245015 | A1 | 8/2014 | Velamoor et al. |
| 2015/0350200 | A1 | 12/2015 | Li et al. |

FOREIGN PATENT DOCUMENTS

| | | |
|---|---|---|
| JP | 2011072019 A | 4/2011 |
| WO | 2008045003 A1 | 4/2008 |

OTHER PUBLICATIONS

"FastAccess Anywhere", Online ad, Retrieved from http://alternativeto.net/software/fastaccess-facial-recognition/, Retrieved on Sep. 19, 2014, 2 pages., Sep. 19, 2014, 2 pgs.

Au, Andrew et al., "Design Specification for a Facial and Speech Identification System (FASIS) for Nokia Devices", Ztitch Solutions, Nov. 14, 2010, 52 pages., Nov. 14, 2010, 52.

Cuervo, Eduardo, "Enhancing Mobile Devices through Code Offload", Dissertation, Dept. of Computer Science, Duke University, 2012, 124 pages., 2012, 124.

De Boer, et al., "Label Placement in 3D Georeferenced and Oriented Digital Photograps using GIS Technology,", Delft University of Technology, Dec. 1, 2007.

Flores, Huber, "Mobile Cloud Middleware", Dissertation, University of Tartu, Faculty of Mathematics and Computer Science, Institute of Computer Science, May 2011, 74 pages., May 1, 2011, 74.

Furman, Susanne et al., "Human Engineering Design Criteria Standards Part 2: Methodology and Interview Results", NISTIR 7934, National Institute of Standards and Technology, U.S. Department of Commerce, Apr. 2014, Apr. 1, 2014, 177pgs.

Naaman, Mor et al., "Leveraging Context to Resolve Identity in Photo Albums", JCDL 2005, pp. 178-187, 2005, 10.

\* cited by examiner

DYNAMIC IMAGE RECOGNITION MODEL UPDATES

CROSS-REFERENCE TO RELATED APPLICATIONS

This application is a divisional of U.S. patent application Ser. No. 16/132,802, filed Sep. 17, 2018, which is a continuation of U.S. patent application Ser. No. 14/561,353, filed Dec. 5, 2014, now U.S. Pat. No. 10,115,185. All sections of the aforementioned application(s) and/or patent(s) are incorporated herein by reference in their entirety.

FIELD OF THE DISCLOSURE

The present disclosure is generally related to image recognition.

BACKGROUND

Mobile devices, such as smartphones and tablet computing devices, may be capable of capturing and processing images (and/or video). Some image processing operations, such as facial recognition or object recognition, may utilize significant processing resources. Such resource-intensive image processing operations may be difficult to perform at a mobile device due to power and/or other resource constraints. In some cases, mobile devices may offload resource-intensive image processing operations to a remote server (e.g., a "cloud" computing resource). However, such offloading may require significant network bandwidth that may not be available to a mobile device at a particular time.

DETAILED DESCRIPTION

Figure 1:
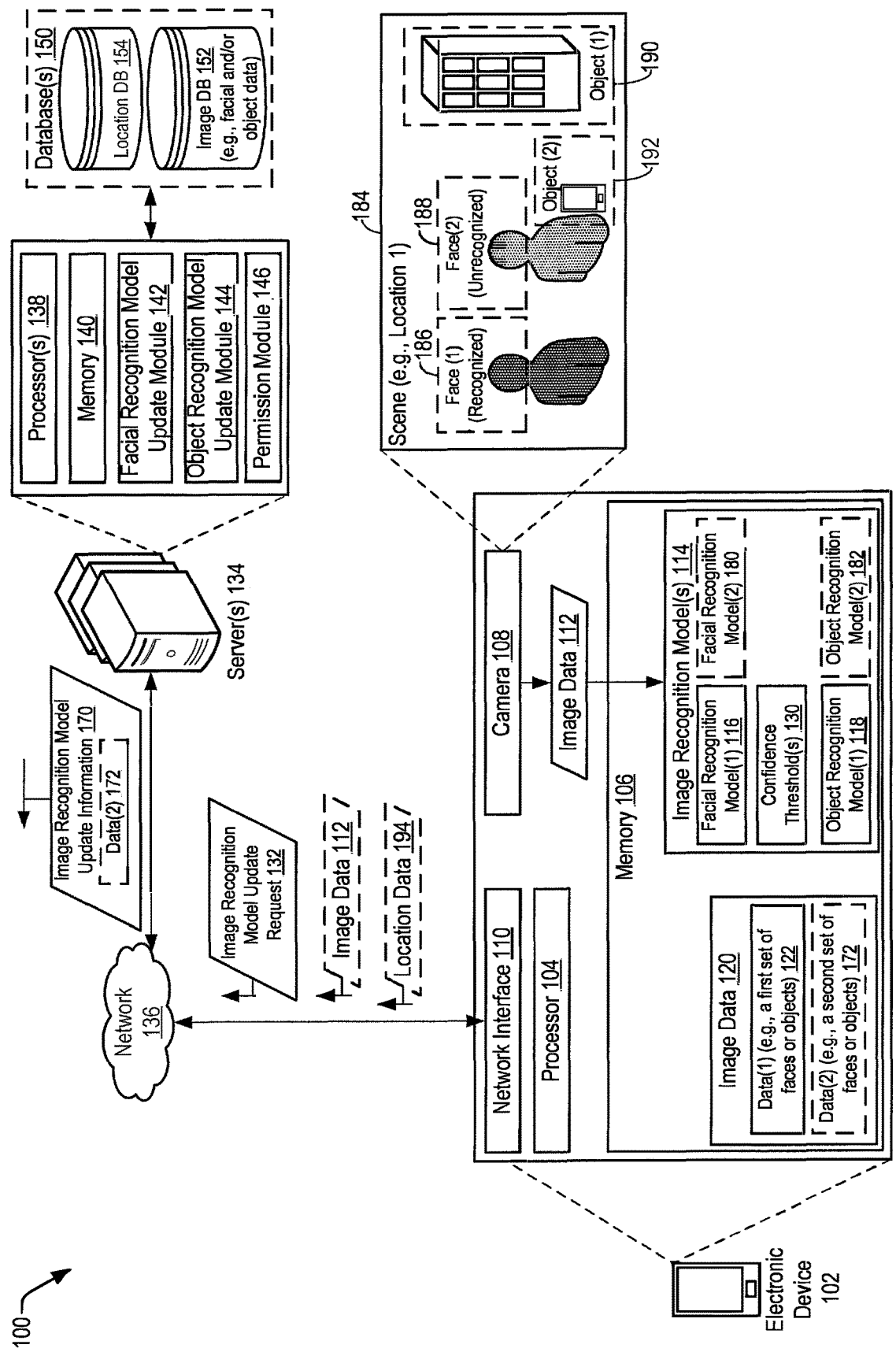
FIG. 1 is a diagram of a particular embodiment of an image recognition system in which an electronic device (e.g., a mobile computing device, such as a smartphone or a tablet computing device) sends an image recognition model update request to a server in order to receive image recognition model update information.

The present disclosure describes systems and methods of dynamically updating an image recognition model that is stored at a memory of an electronic device (e.g., a mobile device, such as a smartphone or a tablet computing device) by sending an image recognition model update request to a server (e.g., on an "as-needed" basis). For example, the image recognition model stored in the memory of the electronic device may correspond to a facial recognition model and/or an object recognition model. The electronic device may perform a first image recognition operation based on the image recognition model that is stored in the memory. When a result of the first image recognition operation (e.g., a confidence value) fails to satisfy a confidence threshold (e.g., when the confidence value for a particular face/object indicates that the particular face/object does not represent a match to a face/object that is stored in the memory), the electronic device may request updated image recognition model information from the server.

In some cases, the server may determine the image recognition model update information to be provided to the electronic device based on a particular context. To illustrate, for a particular user, the electronic device may provide location information that may be used by the server to identify a particular set of faces and/or objects that may be associated with a particular location. As an example, when the user is located at a first location (e.g., at work), a first set of faces or objects may represent commonly encountered images (e.g., faces of co-workers or objects at work) and may represent image data that is appropriate for local storage at the memory of the electronic device for use in performing image recognition operation(s) at the first location. As another example, when the user is located at a second location (e.g., at home), a second set of faces or objects may represent commonly encountered images (e.g., faces of friends and/or family members or objects at home) and may represent image data that is appropriate for local storage at the memory of the electronic device for use in performing image recognition operation(s) at the second location. Thus, the electronic device may receive image recognition model update information from the server that may improve a likelihood of success of an image recognition operation. As memory resources at the electronic device may be limited, the image data (e.g., a set of faces or a set of objects) may be updated based on the recognition model update information to discard image data that may not be contextually relevant for image recognition operations. Thus, the electronic device may request updated information that may improve image recognition performance while reducing an amount of memory at the electronic device that is allocated to storage of image data.

As another example, particular objects may have an object type that is more contextually relevant for a particular location. To illustrate, images of automobiles may represent contextually relevant image data to be stored at the memory of the electronic device when a user is located at an automobile dealership. As another example, images of grocery items may represent contextually relevant image data to be stored at the memory of the electronic device when the user is located at a grocery store. In some cases, an image recognition model that is stored in the memory of the electronic device may represent a generic image recognition model that may include image data associated with generic objects (e.g., a type of automobile, such as a sedan, a coupe, or a truck), while information to generate a more robust image recognition model may be received from the server at the electronic device. In this case, the server may update generic information associated with a particular object with more detailed information for use in performing image recognition operations. To illustrate, an object recognition operation performed at the electronic device may identify a particular type of automobile. The electronic device may send information associated with the particular type of automobile (e.g., a truck) to the server, and the server may provide more detailed image data for use in recognizing particular makes and/or models of trucks. When such information is no longer contextually relevant, the image data may be discarded from the memory of the electronic device to be replaced with alternative image data for use in other image recognition operations.

In some cases, image data may be captured by a camera of the electronic device based on a first set of image capture parameters (e.g., parameters to capture a narrow view of a scene rather than a wide view of the scene). A particular type of object (e.g., a building) may be identified based on an object recognition operation that is performed at the electronic device. The electronic device may send information associated with the particular type of object (e.g., the building), and the server may determine that additional image data may be useful in identifying contextually relevant model updates to be provided to the electronic device. Accordingly, the server may send image capture instructions to the electronic device (e.g., to prompt a user to adjust the image capture parameters or to instruct the electronic device to automatically adjust the parameters). The camera may capture image data based on the updated image capture parameters (e.g., parameters to capture a wide view of a scene) that may allow for identification of another object (e.g., a second building). Information associated with the other identified object (e.g., the second building) may be provided to the server, and the server may provide location information to the electronic device based on the information associated with the first object (e.g., the first building) and based on the information associated with the second object (e.g., the second building). To illustrate, the additional information associated with the second building may be used by the server to more accurately determine a particular location (e.g., a city, a street address, a neighborhood) and provide image data that is contextually relevant for image recognition operations at the particular location (e.g., image data associated with a set of objects that are within a particular distance of the location).

In a particular embodiment, a method includes receiving first image data at an electronic device and performing a first image recognition operation on the first image data based on a first image recognition model stored in a memory of the electronic device. The method may include sending an image recognition model update request from the electronic device to a server, in response to determining that a result of the first image recognition operation fails to satisfy a confidence threshold. The method includes receiving image recognition model update information from the server and updating the first image recognition model based on the image recognition model update information to generate a second image recognition model. The method further includes performing a second image recognition operation (e.g., on the first image data or on second image data) based on the second image recognition model.

In another particular embodiment, a computer-readable storage device stores instructions that are executable by a processor of an electronic device to perform operations. The operations include receiving first image data (e.g., captured by a camera) and performing a first image recognition operation on the first image data based on a first image recognition model. The operations further include sending an image recognition model update request to a server (in response to determining that a result of the first image recognition operation fails to satisfy a confidence threshold). The operations include receiving image recognition model update information from the server and updating the first image recognition model based on the image recognition model update information to generate a second image recognition model. The operations further include performing a second image recognition operation (e.g., on the first image data) based on the second image recognition model. In some cases, the operations may include receiving second image data (e.g., captured by a camera), and the second image recognition operation may be performed on the second image data based on the second image recognition model.

In another particular embodiment, an electronic device includes a processor, and a memory coupled to the processor. In some cases, the electronic device may further include a camera that is configured to capture image data. The memory stores instructions that are executable by the processor to perform various operations. The operations may include performing a first image recognition operation on first image data (that may be captured by the camera) based on a first image recognition model stored in the memory. The operations include determining location data associated with the first image data and sending the location data and an image recognition model update request to a server. The operations further include receiving image recognition model update information (that is determined based at least in part on the location data) from the server. The operations include updating the first image recognition model based on the image recognition model update information to generate a second image recognition model. The operations further include performing a second image recognition operation (e.g., on the first image data or on second image data that may be captured by the camera) based on the second image recognition model.

Referring to FIG. 1, a particular embodiment of an image recognition system is illustrated and generally designated 100. FIG. 1 illustrates a particular example in which an electronic device 102 (e.g., a smartphone, a tablet computing device, etc.) may send an image recognition model update request (e.g., a facial recognition model update request or an object recognition model update request) to a server based on a result of a first image recognition operation that is performed at the electronic device. In response to receiving the image recognition model update request, the server may provide information that may be used by the electronic device 102 to generate an updated image recognition model for performing additional image recognition operations.

In the particular embodiment illustrated in FIG. 1, the electronic device 102 includes a processor 104, a memory 106, a camera 108, and a network interface 110. The camera 108 is configured to capture image data 112 and to provide the image data 112 to one or more image recognition models 114 that are stored in the memory 106 of the electronic device 102. For example, FIG. 1 illustrates that the image recognition model(s) 114 may include a first facial recognition model 116 and a first object recognition model 118. In alternative embodiments, alternative numbers and/or types of image recognition models may be stored in the memory 106. For example, the image recognition model(s) 114 may include one or more facial recognition models but may not include an object recognition model. As another example, the image recognition model(s) 114 may include one or more object recognition models but may not include a facial recognition model.

The electronic device 102 is configured to perform image recognition operation(s) on the image data 112 captured by the camera 108 (or subsequent image data captured by the camera 108) based on the individual image recognition model(s) 114 and based on image data 120 that is stored in the memory 106. For example, in the case of a facial recognition operation, the image data 120 may include first data 122 that includes data associated with a first set of faces. As another example, in the case of an object recognition operation, the image data 120 may include first data 122 that includes data associated with a first set of objects.

The first facial recognition model 116 may include instructions that are executable by the processor 104 to identify whether a particular portion of an image includes features that may be indicative of a human face being present in the particular portion of the image. When the first facial recognition model 116 determines that the particular portion of the image may be associated with a human face, the first facial recognition model 116 may compare data associated with the identified face to the image data 120 (e.g., a first set of faces) to generate a result (e.g., a confidence value).

The first object recognition model 118 may include instructions that are executable by the processor 104 to identify whether a particular portion of an image includes features that may be indicative of an object being present. When the first object recognition model 118 determines that the particular portion of the image may be associated with an object, the first object recognition model 118 may compare data associated with the identified object to the image data 120 (e.g., a first set of objects) to generate a result (e.g., a confidence value).

The electronic device 102 is configured to determine whether a result of a particular image recognition operation (e.g., the confidence value) satisfies a particular confidence threshold 130 (e.g., a confidence threshold for facial recognition or a confidence threshold for object recognition). For example, in the case of a facial recognition operation, the confidence threshold 130 may represent a threshold confidence value for a particular face that is identified in the image data 112 based on the first facial recognition model 116 to be considered a match to a particular face of the first set of faces. As another example, in the case of an object recognition operation, the confidence threshold 130 may represent a threshold confidence value for a particular object that is identified in the image data 112 based on the first object recognition model 118 to be considered a match to a particular object of the first set of objects. In a particular embodiment, the confidence threshold 130 may represent a "non-fixed" threshold that may be dynamically determined based on one or more factors (e.g., a time of day, a time since a last user action, a location, etc.). In some cases, an object recognition model may be a hierarchical model of objection recognition, and the confidence threshold 130 may represent a categorical match associated with a particular category (or level) of a hierarchy. As an illustrative non-limiting example of a hierarchy, a "top" level of the hierarchy may be a "vehicles" category, a "second" level of the hierarchy may include a "cars" sub-category and a "trucks" sub-category, and a "third" level of the hierarchy may include particular makes and/or models of cars and trucks. In this example, the confidence threshold 130 may represent a threshold for an object to be recognized as a vehicle, a threshold for the object to be recognized as a car, a threshold for the object to be recognized as a truck, or a threshold for the objected to be recognized as a particular make and model of car or truck.

In some cases, the confidence threshold 130 may include a "temporal" component. To illustrate, an interest level of a user may be inferred based on a time when the user observes a particular result. In this example, the confidence threshold 130 may be adjusted (e.g., raised or lowered) and may trigger subsequent model loading/evaluations. As another example, the confidence threshold 130 and/or an associated determination of whether the confidence threshold 130 is satisfied may change over time (e.g., a "decaying" confidence level). To illustrate, a confidence level may decrease over time following an event (e.g., a "last user action"). If a threshold time period has elapsed following the event, the confidence level may no longer satisfy the confidence threshold 130. In some cases, a "threshold function" may represent a classifier that may utilize one or more factors as features to make a determination as to whether a face/object is considered a match based on a (machine) learned combination.

In response to determining that a result of an image recognition operation (e.g., a facial recognition operation or an object recognition operation) fails to satisfy the confidence threshold 130, the electronic device 102 is configured to send an image recognition model update request 132 to a server 134 (or multiple servers) via a network 136. In the particular embodiment illustrated in FIG. 1, the server 134 includes a processor 138 (or multiple processors), a memory 140, and one or more image recognition model update modules. For example, the image recognition model update module(s) may include a facial recognition model update module 142 and/or an object recognition model update module 144. In the example of FIG. 1, the server 134 also includes a permission module 146. While not shown in FIG. 1, the permission module 146 may generate a user interface to be communicated to the electronic device 102 via the network 136. The user interface may allow a user of the electronic device 102 to authorize access to images stored at the memory 106 and/or images uploaded to a social networking site by the user (that may be accessible to the server 134 via an application programming interface), among other alternative sources of images for image recognition operations.

The server 134 is configured to communicate with one or more databases 150. In the particular embodiment illustrated in FIG. 1, the database(s) 150 include an image database 152 and (optionally) a location database 154. For example, responsive to a user granting permission, the image database 152 may store data associated with a plurality of faces (e.g., facial data), data associated with a plurality of objects (e.g., object data), or a combination thereof. In response to receiving the image recognition model update request 132, the server 134 is configured to determine one or more model updates associated with a particular image recognition model and to provide the model update(s) to the electronic device 102 (via the network 136) as image recognition model update information 170. For example, the image recognition model update information 170 may include second data 172 (e.g., data associated with a second set of faces or data associated with a second set of objects). In a particular embodiment, the image recognition model update request 132 received by the server 134 may include information that identifies image recognition model information that is stored in the memory 106 of the electronic device 102. For example, individual identifiers may be associated with each of the faces and/or objects that is stored in the memory 106 of the electronic device 102 as the image data 120. The server 134 may determine model update(s) based at least in part on the identifiers received from the electronic device 102. As an example, the facial recognition update module 142 may query the image database 152 to identify data associated with face(s) that are not stored in the memory 106 of the electronic device 102 (to be provided as part of the image recognition model update information 170). The additional facial data provided to the electronic device 102 may improve a likelihood of success of a facial recognition operation that is performed at the electronic device 102. As another example, the object recognition update module 144 may query the image database 152 to identify data associated with object(s) that are not stored in the memory 106 of the electronic device 102 (to be provided as part of the image recognition model update information 170). The additional object data provided to the electronic device 102 may improve a likelihood of success of an object recognition operation that is performed at the electronic device 102.

The electronic device 102 is further configured to receive the image recognition model update information 170 from the server 134 (via the network interface 110) and to store the image recognition model update information 170 in the memory 106 as the second data 172. In some cases, the electronic device 102 may be configured to discard image data associated with one or more faces and/or one or more objects (e.g., at least a portion of the first data 122) stored in the memory 106 in response to receiving the second data 172. The electronic device 102 is further configured to update at least one image recognition model (e.g., the first facial recognition model 116, the first object recognition model 118, or a combination thereof) based on the image recognition model update information 170 to generate a second image recognition model. For example, FIG. 1 illustrates that the updated image recognition models may include a second facial recognition model 180 and/or a second object recognition model 182.

The electronic device 102 is configured to perform a second image recognition operation (or to repeat the first image recognition operation or to perform further processing with respect to the first image recognition operation) based on the second image recognition model. For example, in the case of facial recognition, the electronic device 102 may perform a second facial recognition operation based on the second facial recognition model 180. As another example, in the case of object recognition, the electronic device 102 may perform a second object recognition operation based on the second object recognition model 182. In some cases, the second image recognition operation may be performed on the image data 112 captured by the camera 108 (that may be stored in the memory 106 prior to the electronic device 102 sending the image recognition model update request 132 to the server 134). In other cases, the second image recognition operation may be performed on second image data (not shown in FIG. 1) that is captured by the camera 108 (e.g., after the second image recognition model has been generated).

In operation, the camera 108 of the electronic device 102 may capture an image of a scene 184 (associated with a first location) and may provide information associated with the captured image to one or more of the image recognition models 114 as the image data 112. For illustrative purposes only, the scene 184 of FIG. 1 includes a first face 186, a second face 188, a first object 190, and a second object 192. In alternative embodiments, information associated with an alternative number of faces and/or objects may be captured by the camera 108 and provided as the image data 112.

As an example of facial recognition, the first facial recognition model 116 may identify the first face 186 in the image data 112 based on data associated with the first face 186. For example, when the first facial recognition model 116 determines that a particular portion of the image associated with the first face 186 includes data that is indicative of a human face being present, the first facial recognition model 116 may generate a result (e.g., a confidence value) by comparing the data associated with the first face 186 to the first data 122 (e.g., a first set of faces) that is stored in the memory 106. To illustrate, the confidence value may include a matching score that is calculated based on a similarity between various identifying facial parameters (e.g., a skin tone, an eye color, or facial dimensions, among other alternatives). The first facial recognition model 116 may determine whether the confidence value satisfies a particular confidence threshold 130. For example, the confidence threshold 130 may represent a threshold confidence value for the first face 186 to be considered a match to a particular face of the first set of faces (of the first data 122). In the example of FIG. 1, the first facial recognition model 116 may determine that the first face 186 satisfies the confidence threshold 130, representing a facial match fora particular face of the first set of faces (of the first data 122). That is, the first face 186 may represent a face that is recognized based on the first facial recognition model 116 and based on the first data 122 stored in the memory 106.

As another example of facial recognition, the first facial recognition model 116 may identify the second face 188 in the image data 112 based on data associated with the second face 188. For example, when the first facial recognition model 116 determines that a particular portion of the image associated with the second face 188 includes data that is indicative of a human face being present, the first facial recognition model 116 may generate a result (e.g., a confidence value) by comparing the data associated with the second face 188 to the first data 122 (e.g., the first set of faces). The first facial recognition model 116 may determine whether the confidence value satisfies the confidence threshold 130. For example, the confidence threshold 130 may represent a threshold confidence value for the second face 188 to be considered a match to a particular face of the first set of faces (of the first data 122). In the example of FIG. 1, the first facial recognition model 116 may determine that the second face 188 fails to satisfy the confidence threshold 130. That is, the second face 188 may represent a face that is not recognized based on the first facial recognition model 116 and based on the first data 122 stored in the memory 106. FIG. 1 illustrates that the electronic device 102 may send the image recognition model update request 132 to the server 134 in response to determining that the result of the image recognition operation performed on the second face 188 (using the first facial recognition model 116) fails to satisfy the confidence threshold 130. In the particular embodiment illustrated in FIG. 1 (as identified by dashed lines), the electronic device 102 may also send at least a portion of the image data 112 captured by the camera 108 (e.g., data associated with the second face 118) to the server 134. Further, in some cases (as identified by dashed lines), the electronic device 102 may send location data 194 (e.g., GPS coordinates or other location identification information) to the server 134. While not shown in FIG. 1, the permission module 146 of the server 134 may generate a user interface to be communicated to the electronic device 102 via the network 136. The user interface may allow a user of the electronic device 102 to authorize use of location data for image recognition operations.

In response to receiving the image recognition model update request 132, the facial recognition model update module 142 of the server 134 may determine the image recognition model update information 170 to be provided to the electronic device 102. To illustrate, the facial recognition model update module 142 may access at least the image database 152 to determine the image recognition model update information 170. In some cases, the facial recognition model update module 142 may access the location database 154 (e.g., when the electronic device 102 sends the location data 194) and determine the image recognition model update information 170 based at least in part on the location data 194. Further, in some cases, the facial recognition update module 142 may determine the image recognition model update information 170 based at least in part on the image data 112 received from the electronic device 102 (e.g., data associated with the second face 188 that is not recognized based on the first image recognition operation).

As an illustrative, non-limiting example, the server 134 may determine the image recognition model update information 170 (e.g., facial data) to be provided to the electronic device 102 based on a particular context. The particular context may be determined based on the image data 112, the location data 194, or a combination thereof. To illustrate, the server 134 may utilize the location data 194 to identify, for a particular user associated with the electronic device 102, a particular set of faces that may be associated with a particular location. As an example, when the user is located at a first location (e.g., at work), a first set of faces may represent commonly encountered images (e.g., faces of co-workers) and may represent image data that is appropriate for local storage at the memory 106 of the electronic device 102 for use in performing facial recognition operation(s) at the first location. As an illustrative, non-limiting example, the server 134 may determine particular faces associated with the first location based on images posted to social networking sites (e.g., after a user has "checked in" at the first location) or images that are communicated via a messaging service when the user is located at the first location (e.g., as determined based on GPS coordinates). Alternatively, a user may provide information to the server 134 that identifies particular faces that are commonly encountered at the first location. As another example, when the user is located at a second location (e.g., at home), a second set of faces may represent commonly encountered images (e.g., faces of friends and/or family members) and may represent image data that is appropriate for local storage at the memory 106 of the electronic device 102 for use in performing facial recognition operation(s) at the second location. As an illustrative, non-limiting example, the server 134 may determine particular faces associated with the second location based on images posted to social networking sites (e.g., after a user has "checked in" at the second location) or images that are communicated via a messaging service when the user is located at the second location (e.g., as determined based on GPS coordinates). Alternatively, a user may provide information to the server 134 that identifies particular faces that are commonly encountered at the second location. Thus, the image recognition model update information 170 identified by the server 134 may improve a likelihood of success of a facial recognition operation that is performed at the electronic device 102.

The electronic device 102 may receive the image recognition model update information 170 from the server 134 (via the network interface 110) and may store the image recognition model update information 170 in the memory 106 (e.g., as the second data 172). In this example, the second data 172 may include a second set of faces to be used when performing facial recognition operations. As memory resources at the electronic device 102 may be limited, the image data 120 stored in the memory 106 may be updated based on the image recognition model update information 170. For example, the electronic device 102 may determine that data associated with one or more faces of the first set of faces is to be discarded, because data associated with particular faces may not be contextually relevant for certain image recognition operations. The electronic device 102 may generate the second facial recognition model 180 based on the image recognition model update information 170.

As an example of object recognition, the first object recognition model 118 may identify the first object 190 (e.g., a building) in the image data 112 based on data associated with the first object 190. For example, when the first object recognition model 118 determines that a particular portion of the image associated with the first object 190 includes data that is indicative of an object being present, the first object recognition model 116 may generate a result (e.g., a confidence value) by comparing the data associated with the first object 190 to the first data 122 (e.g., a first set of objects) that is stored in the memory 106. To illustrate, the confidence value may include a matching score that is calculated based on a similarity between various identifying object parameters (e.g., object dimensions, an object color, or an object shape, among other alternatives). The first object recognition model 118 may determine whether the confidence value satisfies a particular confidence threshold 130. For example, the confidence threshold 130 may represent a threshold confidence value for the first object 190 to be considered a match to a particular object of the first set of objects (of the first data 122).

As another example of object recognition, the first object recognition model 118 may identify the second object 192 (e.g., a device) in the image data 112 based on data associated with the second object 192. For example, when the first object recognition model 118 determines that a particular portion of the image associated with the second object 192 includes data that is indicative of an object being present, the first object recognition model 116 may generate a result (e.g., a confidence value) by comparing the data associated with the second object 192 to the first data 122 (e.g., a first set of objects) that is stored in the memory 106. To illustrate, the confidence value may include a matching score that is calculated based on a similarity between various identifying object parameters (e.g., object dimensions, an object color, or an object shape, among other alternatives). The first object recognition model 118 may determine whether the confidence value satisfies a particular confidence threshold 130. For example, the confidence threshold 130 may represent a threshold confidence value for the second object 192 to be considered a match to a particular object of the first set of objects (of the first data 122).

FIG. 1 illustrates that the electronic device 102 may send the image recognition model update request 132 to the server 134 in response to determining that the result of the image recognition operation performed on the first object 190 or the second object 192 (using the first object recognition model 118) fails to satisfy the confidence threshold 130. In response to receiving the image recognition model update request 132, the object recognition model update module 144 of the server 134 may determine the image recognition model update information 170 to be provided to the electronic device 102. To illustrate, the object recognition model update module 144 may access at least the image database 152 to determine the image recognition model update information 170.

As an illustrative, non-limiting example, the server 134 may determine the image recognition model update information 170 (e.g., object data) to be provided to the electronic device 102 based on a particular context. The particular context may be determined based on the image data 112, the location data 194, or a combination thereof. To illustrate, the server 134 may utilize the location data 194 to identify, for a particular user associated with the electronic device 102, a particular set of objects that may be associated with a particular location. As an example, when the user is located at a first location (e.g., at work), a first set of objects may represent commonly encountered images (e.g., objects at work) and may represent image data that is appropriate for local storage at the memory 106 of the electronic device 102 for use in performing object recognition operation(s) at the first location. As another example, when the user is located at a second location (e.g., at home), a second set of objects may represent commonly encountered images (e.g., objects at home) and may represent image data that is appropriate for local storage at the memory 106 of the electronic device 102 for use in performing object recognition operation(s) at the second location. Thus, the image recognition model update information 170 identified by the server 134 may improve a likelihood of success of an object recognition operation that is performed at the electronic device 102.

The electronic device 102 may receive the image recognition model update information 170 from the server 134 (via the network interface 110) and may store at least a portion of the image recognition model update information 170 in the memory 106 (e.g., as the second data 172). In this example, the second data 172 may include a second set of objects to be used when performing object recognition operations. As memory resources at the electronic device 102 may be limited, the image data 120 stored in the memory 106 may be updated based on the image recognition model update information 170. For example, the electronic device 102 may determine that data associated with one or more objects of the first set of objects is to be discarded, as data associated with particular objects may not be contextually relevant for image recognition operations. The electronic device 102 may generate the second object recognition model 182 based on the image recognition model update information 170.

Thus, FIG. 1 illustrates that the electronic device 102 may perform a first image recognition operation on the image data 112 to generate a result (e.g., a confidence value). For example, the electronic device 102 may determine whether the confidence value associated with a particular face and/or a particular object that is identified based on the image data 112 satisfies a particular confidence threshold 130. When the confidence threshold 130 is not satisfied, the electronic device 102 may send the image recognition model update request 132 to the server 134, and the server 134 may respond by providing the image recognition model update information 170 (that includes the second data 172, such as a second set of faces and/or objects). The electronic device 102 may generate a second image recognition model based on image recognition model update information 170 in order to perform a second image recognition operation (e.g., to identify a face and/or an object that was not recognized based on the first image recognition operation).

Figure 2:
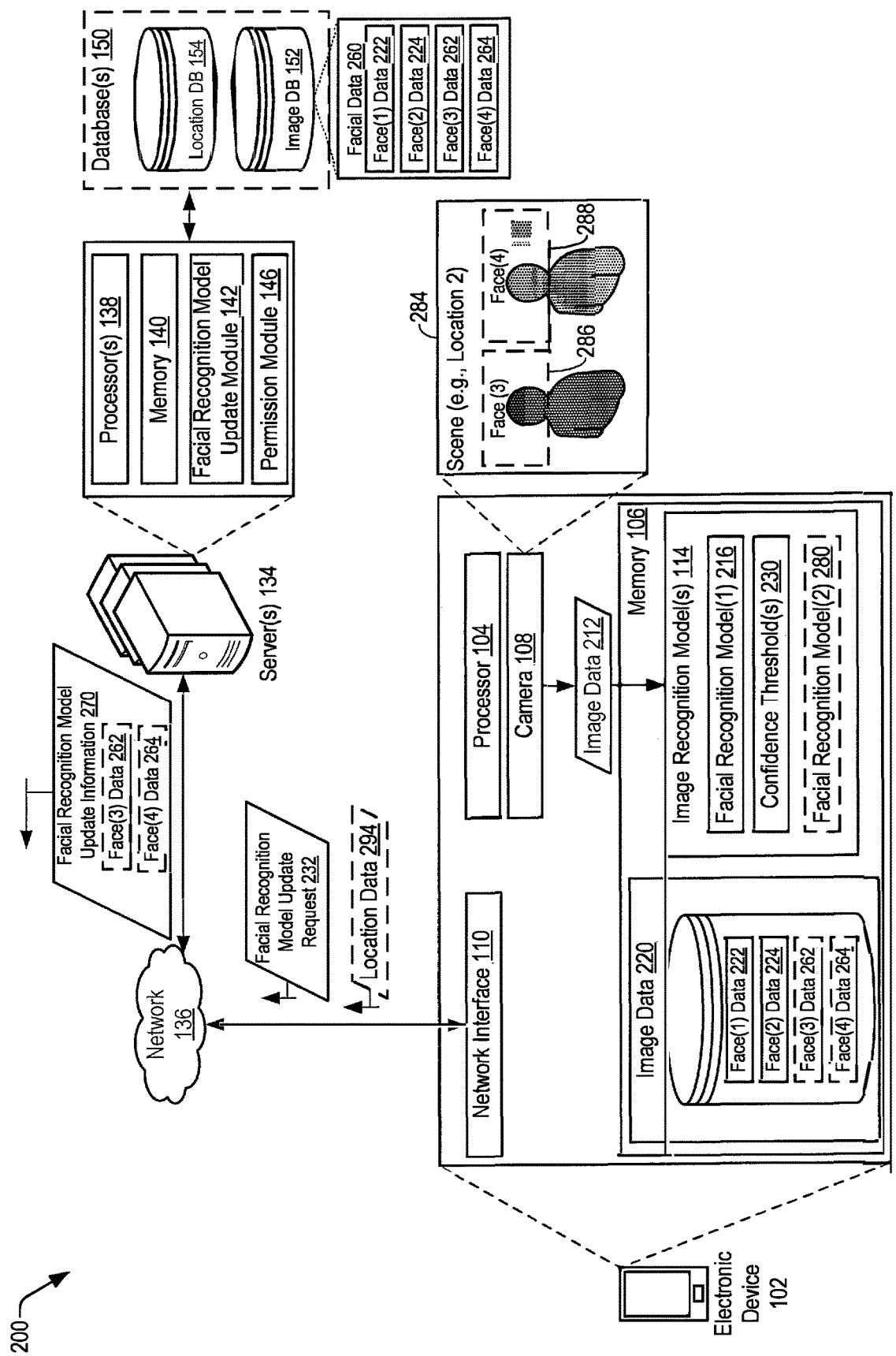
FIG. 2 is a diagram of another embodiment of an image recognition system in which an electronic device sends an image recognition model update request (e.g., a facial recognition model update request) to a server in order to receive image recognition model update information.

Referring to FIG. 2, another embodiment of an image recognition system is illustrated and generally designated 200. FIG. 2 illustrates a particular example in which the electronic device 102 may send a facial recognition model update request to a server based on a result of a first facial recognition operation that is performed at the electronic device. For example, the electronic device 102 may identify face(s) in a particular image, but a confidence value associated with the identified face(s) may not satisfy a confidence threshold associated with a recognized face. The server may provide information that may be used by the electronic device 102 to generate an updated facial recognition model.

In the particular embodiment illustrated in FIG. 2, the camera 108 of the electronic device 102 may capture an image of a scene 284 (associated with a second location) and provide information associated with the captured image (as image data 212) to a first facial recognition model 216 that is stored in the memory 206 of the electronic device 102. For illustrative purposes only, the scene 284 of FIG. 2 includes a third face 286 and a fourth face 288. In alternative embodiments, information associated with an alternative number of faces and/or objects may be captured by the camera 108 and provided as the image data 212. The electronic device 102 performs a first facial recognition operation on the image data 212 based on the first facial recognition model 216 and based on image data 220 that is stored in the memory 106. FIG. 2 illustrates a particular example in which the image data 220 may include first data associated with a first set of faces (e.g., data 222 associated with a first face and data 224 associated with a second face).

As an example, the first facial recognition model 216 may identify the third face 286 in the image data 212 based on data associated with the third face 286. In some cases, the first facial recognition model 216 may determine a confidence value by comparing the data associated with the third face 286 to the first set of faces (e.g., the first face 222 and the second face 224). The first facial recognition model 216 may determine whether the confidence value satisfies a particular confidence threshold 230. In the example of FIG. 2, the first facial recognition model 216 may determine that the third face 286 fails to satisfy the confidence threshold 230. That is, the second face 286 may represent a face that is not recognized based on the first facial recognition model 216 and based on the first facial data that is stored in the memory 106.

As another example, the first facial recognition model 216 may identify the fourth face 288 in the image data 212 based on data associated with the fourth face 288. For example, the first facial recognition model 216 may determine a confidence value by comparing the data associated with the fourth face 288 to the first set of faces (e.g., the first face 222 and the second face 224). The first facial recognition model 216 may determine whether the confidence value satisfies a particular confidence threshold 230. In the example of FIG. 2, the first facial recognition model 216 may determine that the fourth face 288 fails to satisfy the confidence threshold

230. That is, the fourth face 288 may represent a face that is not recognized based on the first facial recognition model 216 and based on the first facial data that is stored in the memory 106.

FIG. 2 illustrates that the electronic device 102 may send a facial recognition model update request 232 to the server 134 in response to determining that the result (e.g., the confidence value) of the image recognition operation performed on the third face 286 and the fourth face 288 (using the first facial recognition model 216) fails to satisfy the confidence threshold 230. In the particular embodiment illustrated in FIG. 2, the electronic device 102 may also send location data 294 (e.g., GPS coordinates or other location identification information) to the server 134.

In response to receiving the facial recognition model update request 232, the facial recognition model update module 142 of the server 134 may determine facial recognition model update information 270 to be provided to the electronic device 102. To illustrate, the facial recognition model update module 142 may access at least the image database 152 to determine the facial recognition model update information 270. In some cases, the facial recognition model update module 142 may access the location database 154 (e.g., when the electronic device 102 sends the location data 294) and determine the facial recognition model update information 270 based at least in part on the location data 294. In the example of FIG. 2, the image database 152 stores facial data 260 associated with a plurality of faces. To illustrate, the facial data 260 may include first facial data 222, second facial data 224, third facial data 262, and fourth facial data 264. In alternative embodiments, the facial data 160 may include data associated with an alternative number of faces.

As an illustrative, non-limiting example, the server 134 may determine the facial recognition model update information 270 (e.g., second facial data) to be provided to the electronic device 102 based on a particular context. FIG. 2 illustrates a particular embodiment in which the particular context may be determined based on the location data 294. To illustrate, the server 134 may utilize the location data 294 to identify, for a particular user associated with the electronic device 102, a particular set of faces that may be associated with a particular location (e.g., the second location in FIG. 2). As an example, when the second location is associated with an office, the second facial data (e.g., the data 262 associated with the third face and the data 264 associated with the fourth face) may represent commonly encountered images (e.g., faces of co-workers) and may represent image data that is appropriate for local storage at the memory 106 of the electronic device 102 for use in performing facial recognition operation(s) at the second location. As another example, when the second location is associated with a residence, the second facial data (e.g., the data 262 associated with the third face and the data 264 associated with the fourth face) may represent commonly encountered images (e.g., faces of friends and/or family members) and may represent image data that is appropriate for local storage at the memory 106 of the electronic device 102 for use in performing facial recognition operation(s) at the second location. Thus, the facial recognition model update information 270 identified by the server 134 may improve a likelihood of success of a facial recognition operation that is performed at the electronic device 102 (at the second location).

The electronic device 102 may receive the facial recognition model update information 270 from the server 134 (via the network interface 110) and may store the facial recognition model update information 270 in the memory 106 (e.g., the third facial data 262 and the fourth facial data 264). As memory resources at the electronic device 102 may be limited, the image data 220 stored in the memory 106 may be updated based on the facial recognition model update information 270. For example, the electronic device 102 may determine that data associated with one or more faces of the first set of faces is to be discarded, as data associated with particular faces may not be contextually relevant for image recognition operations at the second location. The electronic device 102 may update the first facial recognition model 216 based on the facial recognition model update information 270 to generate a second image recognition model 280.

The electronic device 102 may perform a second facial recognition operation based on the second facial recognition model 280. For example, the second image recognition operation may be performed on the image data 212 captured by the camera 108 (that may be stored in the memory 106 prior to the electronic device 102 sending the facial recognition model update request 232 to the server 134). In other cases, the second image recognition operation may be performed on second image data (not shown in FIG. 2) that is captured by the camera 108 (e.g., after the second image recognition model has been generated).

Thus, FIG. 2 illustrates that the electronic device 102 may perform a first facial recognition operation on the image data 212 to generate results (e.g., confidence values). For example, the electronic device 102 may determine whether the confidence value associated with a particular face that is identified based on image data satisfies a particular confidence threshold 230. When the confidence threshold 230 is not satisfied, the electronic device 102 may send the facial recognition model update request 232 to the server 134, and the server 134 may provide the facial recognition model update information 270. The electronic device 102 may generate a second facial recognition model based on the facial recognition model update information 270 in order to perform a second facial recognition operation (e.g., to identify a face that was not recognized based on the first facial recognition operation).

Figure 3:
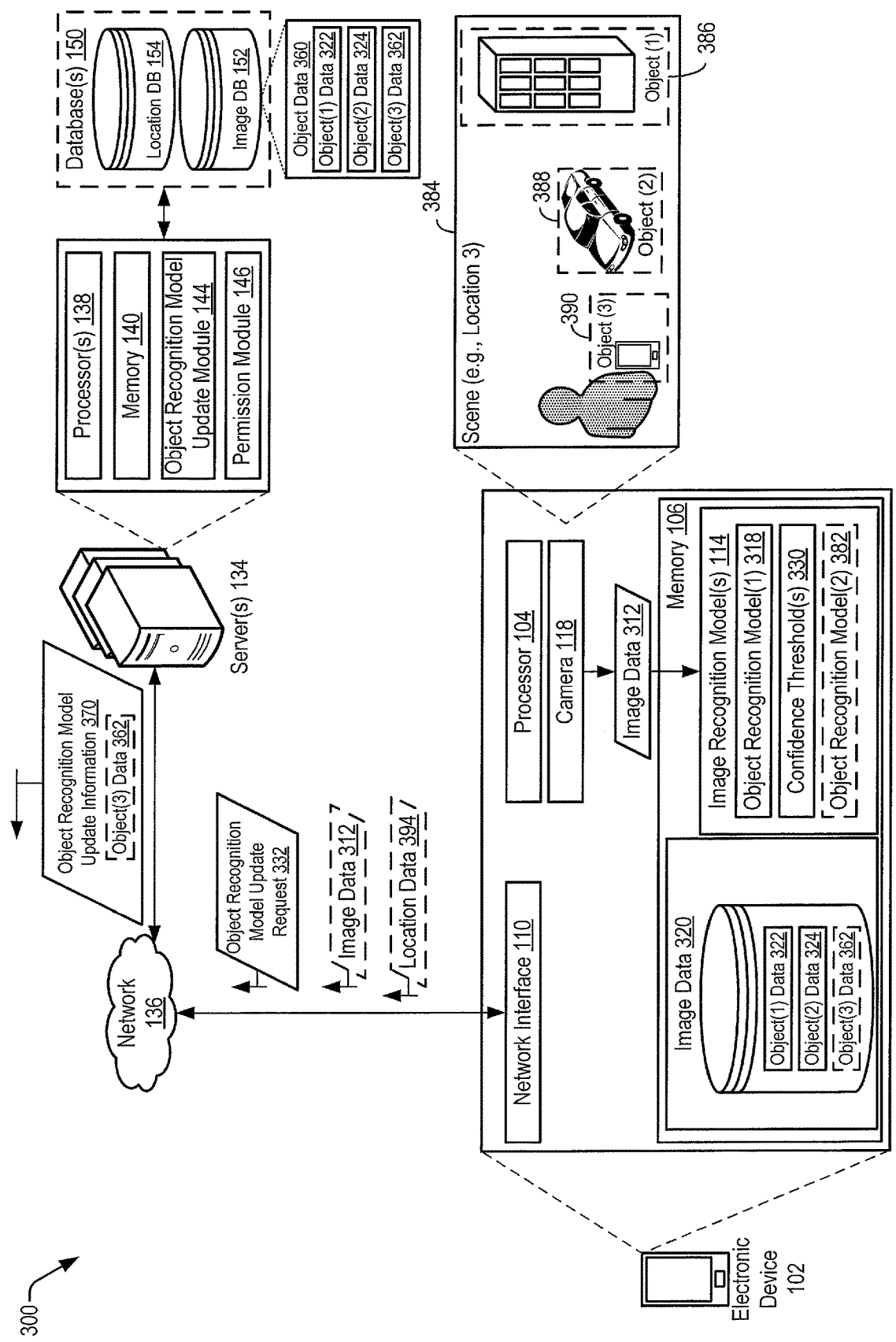
FIG. 3 is a diagram of another embodiment of an image recognition system in which an electronic device sends an image recognition model update request (e.g., an object recognition model update request) to a server in order to receive image recognition model update information.

Referring to FIG. 3, another embodiment of an image recognition system is illustrated and generally designated 300. FIG. 3 illustrates a particular example in which the electronic device 102 may send an object recognition model update request to a server based on a result of a first object recognition operation that is performed at the electronic device 102. For example, the electronic device 102 may identify object(s) in a particular image, but a confidence value associated with the identified object(s) may not satisfy a confidence threshold associated with a recognized object. The server may provide information that may be used by the electronic device 102 to generate an updated object recognition model.

In the particular embodiment illustrated in FIG. 3, the camera 108 of the electronic device 102 may capture an image of a scene 384 (associated with a third location) and may provide information associated with the captured image (as image data 312) to a first object recognition model 318 that is stored in the memory 106 of the electronic device 102. For illustrative purposes only, the scene 384 of FIG. 3 includes a first object 386, a second object 388, and a third object 390. In alternative embodiments, information associated with an alternative number of faces and/or objects may be captured by the camera 108 and provided as the image data 312. The electronic device 102 performs a first object recognition operation on the image data 312 based on the first object recognition model 318 and based on image data 320 that is stored in the memory 106. FIG. 3 illustrates a particular example in which the image data 320 may include first data associated with a first set of objects (e.g., data 322 associated with a first object and data 324 associated with a second object).

As an example, the first object recognition model 318 may identify the first object 386, the second object 388, and the third object 390 in the image data 312. In some cases, the first object recognition model 318 may determine confidence values by comparing the data associated with the identified objects 386, 388 and 390 to the first set of objects (e.g., the first object data 322 and the second object data 324). The first object recognition model 318 may determine whether the individual confidence values satisfy a particular confidence threshold 330. In the example of FIG. 3, the first object recognition model 318 may determine that the third object 390 fails to satisfy the confidence threshold 330. That is, the third object 390 may represent an object that is not recognized based on the first object recognition model 318 and based on the first object data that is stored in the memory 106.

FIG. 3 illustrates that the electronic device 102 may send an object recognition model update request 332 to the server 134 in response to determining that the result of the image recognition operation performed on the third object 390 fails to satisfy the confidence threshold 330. In the particular embodiment illustrated in FIG. 3, the electronic device 102 may also send the image data 312 and location data 394 (e.g., GPS coordinates or other location identification information) to the server 134.

In response to receiving the object recognition model update request 332, the object recognition model update module 144 of the server 134 may determine object recognition model update information 370 to be provided to the electronic device 102. To illustrate, the object recognition model update module 144 may access at least the image database 152 to determine the object recognition model update information 370. In some cases, the object recognition model update module 144 may access the location database 154 (e.g., when the electronic device 102 sends the location data 394) and determine the object recognition model update information 370 based at least in part on the location data 394. In the example of FIG. 3, the image database 152 stores object data 360 associated with a plurality of objects. To illustrate, the object data 360 may include the first object data 322, the second object data 324, and third object data 362. In alternative embodiments, the object data 360 may include data associated with an alternative number of objects.

As an illustrative, non-limiting example, the server 134 may determine the object recognition model update information 370 (e.g., data associated with a second set of objects) to be provided to the electronic device 102 based on a particular context. FIG. 3 illustrates a particular embodiment in which the particular context may be determined based on the image data 312 and based on the location data 394. To illustrate, the server 134 may utilize the image data 312 to query the image database 152 for additional object information and may utilize the location data 394 to identify, for a particular user associated with the electronic device 102, a particular set of objects that may be associated with a particular location (e.g., the third location in FIG. 3). As an example, when the third location is associated with an office, the second object data (e.g., the data 362 associated with the third object) may represent a commonly encountered image (e.g., an object at work) and may represent image data that is appropriate for local storage at the memory 106 of the electronic device 102 for use in performing object recognition operation(s) at the third location. As another example, when the third location is associated with a residence, the second object data (e.g., the data 362 associated with the third object) may represent a commonly encountered image (e.g., an object at home) and may represent image data that is appropriate for local storage at the memory 106 of the electronic device 102 for use in performing object recognition operation(s) at the third location. Thus, the object recognition model update information 370 identified by the server 134 may improve a likelihood of success of an object recognition operation that is performed at the electronic device 102 (at the third location).

The electronic device 102 may receive the object recognition model update information 370 from the server 134 (via the network interface 110) and may store the object recognition model update information 370 in the memory 106 (e.g., the third object data 362). As memory resources at the electronic device 102 may be limited, the image data 320 stored in the memory 106 may be updated based on the object recognition model update information 370. For example, the electronic device 102 may determine that data associated with one or more objects of the first set of objects is to be discarded, as data associated with particular objects may not be contextually relevant for image recognition operations at the third location. The electronic device 102 may update the first object recognition model 318 based on the object recognition model update information 370 to generate a second object recognition model 382.

The electronic device 102 may perform a second object recognition operation based on the second object recognition model 382. For example, the second object recognition operation may be performed on the image data 312 captured by the camera 108 (that may be stored in the memory 106 prior to the electronic device 102 sending the object recognition model update request 332 to the server 134). In other cases, the second image recognition operation may be performed on second image data (not shown in FIG. 3) that is captured by the camera 108 (e.g., after the second object recognition model 382 has been generated).

Thus, FIG. 3 illustrates that the electronic device 102 may perform a first object recognition operation on the image data 312 to generate results (e.g., confidence values). For example, the electronic device 102 may determine whether the confidence value associated with a particular object that is identified based on image data satisfies a particular confidence threshold 330. When the confidence threshold 330 is not satisfied, the electronic device 102 may send the object recognition model update request 332 to the server 134, and the server 134 may provide the object recognition model update information 370. The electronic device 102 may generate a second object recognition model based on the object recognition model update information 370 in order to perform a second object recognition operation (e.g., to identify an object that was not recognized based on the first facial recognition operation).

Figure 4:
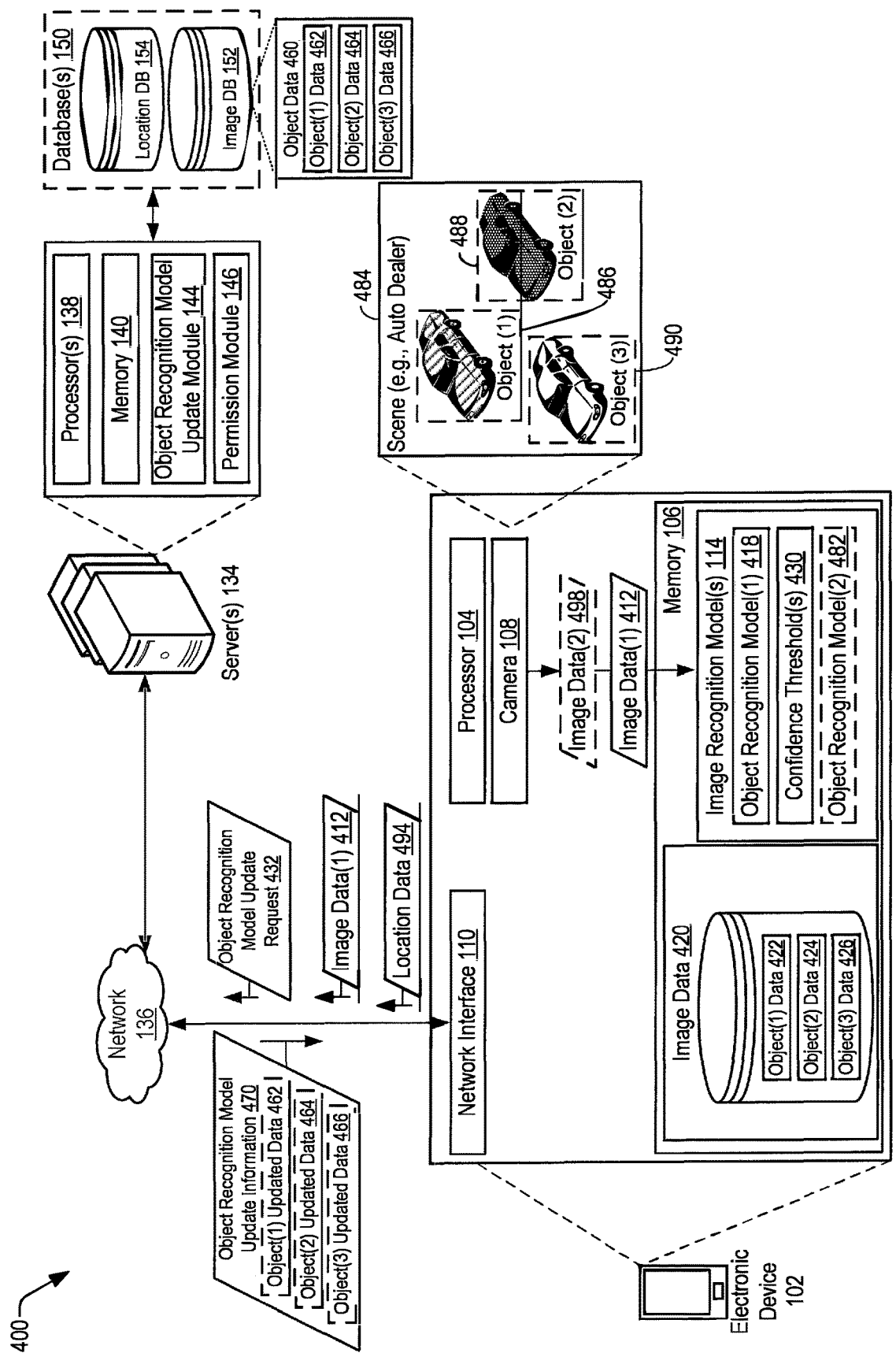
FIG. 4 is a diagram of another embodiment of an image recognition system in which an electronic device sends an image recognition model update request (e.g., an object recognition model update request) to a server in order to receive image recognition model update information.

Referring to FIG. 4, another embodiment of an image recognition system is illustrated and generally designated 400. FIG. 4 illustrates a particular example in which the electronic device 102 may send an object recognition model update request to a server based on a result of a first object recognition operation that is performed at the electronic device 102. For example, the electronic device 102 may be able to recognize generic features of particular objects (e.g., a color of an automobile) but may not be able to recognize more detailed features of the particular objects (e.g., a make/model of the particular automobile). The server may provide information that may be used by the electronic device 102 to generate an updated object recognition model.

In the particular embodiment illustrated in FIG. 4, the camera 108 of the electronic device 102 may capture an image of a scene 484 (associated with an automobile dealer location) and may provide information associated with the captured image as first image data 412 to a first object recognition model 418 that is stored in the memory 106 of the electronic device 102. For illustrative purposes only, the scene 484 of FIG. 4 includes a first object 486, a second object 488, and a third object 490. In alternative embodiments, the scene 484 may include an alternative number of objects and/or faces. The electronic device 102 performs a first object recognition operation on the first image data 412 based on the first object recognition model 418 and based on image data 420 that is stored in the memory 106. FIG. 4 illustrates a particular example in which the image data 420 may include first data associated with a first set of objects (e.g., first object data 422, second object data 424, and third object data 426).

As an example, the first object recognition model 418 may identify the first object 486 as a first type of automobile (e.g., a red car), may identify the second object 488 as a second type of automobile (e.g., a blue car), and may identify the third object 490 as a third type of automobile (e.g., a white car) in the first image data 412 based on the image data 420 stored in the memory 106. For example, the first object recognition model 418 may generate results (e.g., individual confidence values) by comparing the data associated with the objects 486, 488, and 490 to a first set of objects (e.g., the first object data 422, the second object data 424, and the third object data 426). The first object recognition model 418 may determine whether the individual confidence values satisfy a particular confidence threshold 430. In the example of FIG. 4, the first object recognition model 418 may determine that the objects 486, 488, and 490 may be generically identified as automobiles having particular colors. However, the first object recognition model 418 may determine that the confidence values associated with the objects 486, 488, and 490 fail to satisfy the confidence threshold 430 (that may represent a threshold confidence value for a particular object to represent a match to a particular make and/or model of automobile).

FIG. 4 illustrates that the electronic device 102 may send an object recognition model update request 432 to the server 134 in response to determining that the result (e.g., the confidence value) of the image recognition operation performed on the first image data 412 fails to satisfy the confidence threshold 430. In the particular embodiment illustrated in FIG. 4, the electronic device 102 may also send the first image data 412 and location data 494 (e.g., GPS coordinates or other location identification information) to the server 134.

In response to receiving the object recognition model update request 432, the object recognition model update module 144 of the server 134 may determine object recognition model update information 470 to be provided to the electronic device 102. To illustrate, the object recognition model update module 144 may access at least the image database 152 to determine the object recognition model update information 470. In the example of FIG. 4, the object recognition model update module 144 may access the location database 154 and determine the object recognition model update information 470 based at least in part on the location data 494. In the example of FIG. 4, the image database 152 stores object data 460 associated with a plurality of objects. To illustrate, the object data 460 may include the first object data 462, second object data 464, and third object data 466. In alternative embodiments, the object data 460 may include an alternative number of objects.

The electronic device 102 may receive the object recognition model update information 470 from the server 134 (via the network interface 110) and may store at least a portion of the object recognition model update information 470 in the memory 106. The electronic device 102 may update the first object recognition model 418 based on the object recognition model update information 470 to generate a second object recognition model 482. The electronic device 102 may perform a second object recognition operation based on the second object recognition model 482. In the particular embodiment illustrated in FIG. 4, the camera 108 may capture information associated with the scene 484 and provide the information as second image data 498 to the second object recognition model 482. The second object recognition operation may be performed on the second image data 498 captured by the camera 108.

Thus, FIG. 4 illustrates a particular example in which the electronic device 102 may send an object recognition model update request to a server based on a result (e.g., a confidence value) of a first object recognition operation that is performed at the electronic device 102. For example, the electronic device 102 may be able to recognize generic features of particular objects (e.g., a color of an automobile) but may not be able to recognize more detailed features of the particular objects (e.g., a make/model of the particular automobile). The server may provide information that may be used by the electronic device 102 to generate an updated object recognition model.

Figure 5:
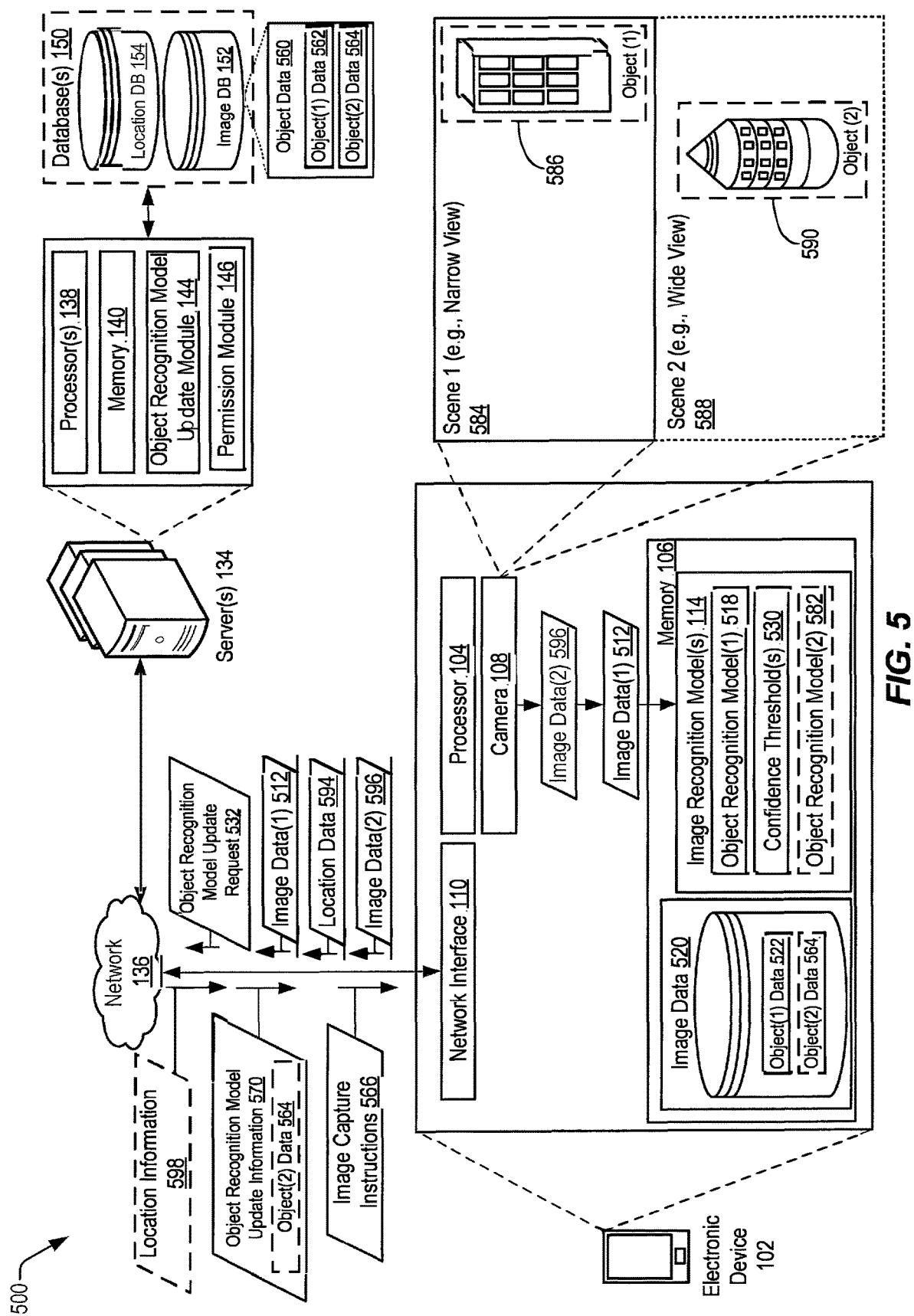
FIG. 5 is a diagram of another embodiment of an image recognition system in which an electronic device sends an image recognition model update request (e.g., an object recognition model update request) to a server in order to receive image recognition model update information (along with image capture instructions to capture additional image data for use by the server to provide location information to the electronic device)

Referring to FIG. 5, another embodiment of an image recognition system is illustrated and generally designated 500. FIG. 5 illustrates a particular example in which the electronic device 102 may send an object recognition model update request to a server based on a result (e.g., a confidence value) of a first object recognition operation that is performed at the electronic device 102. For example, the electronic device 102 may capture information associated with an object based on first image capture parameters, and the server may provide image capture instructions such that the electronic device 102 may capture additional information for use by the server. The server may provide information that may be used by the electronic device 102 to generate an updated object recognition model.

In the particular embodiment illustrated in FIG. 5, the camera 108 of the electronic device 102 may capture an image of a first scene 584 and may provide information associated with the captured image as first image data 512 to a first object recognition model 518 that is stored in the memory 106 of the electronic device 102. For illustrative purposes only, the first scene 584 of FIG. 5 includes a first object 586 (e.g., a building). The electronic device 102 performs a first object recognition operation on the first image data 512 based on the first object recognition model 518 and based on image data 520 that is stored in the memory 106. FIG. 5 illustrates a particular example in which the image data 520 may include first data associated with a first set of objects (e.g., first object data 522).

As an example, the first object recognition model 518 may identify the first object 586 in the first scene 584. FIG. 5 illustrates that the electronic device 102 may send an object recognition model update request 532 to the server 134 in response to determining that the result (e.g., a confidence value) of the image recognition operation performed on the first object 586 fails to satisfy a confidence threshold 530. In the particular embodiment illustrated in FIG. 5, the electronic device 102 may also send the first image data 512 and location data 594 (e.g., GPS coordinates or other location identification information) to the server 134.

In response to receiving the object recognition model update request 532, the object recognition model update module 144 of the server 134 may determine object recognition model update information 570 to be provided to the electronic device 102. To illustrate, the object recognition model update module 144 may access at least the image database 152 to determine the object recognition model update information 570. In some cases, the object recognition model update module 144 may access the location database 154 (e.g., when the electronic device 102 sends the location data 594) and determine the object recognition model update information 570 based at least in part on the location data 594. In the example of FIG. 5, the image database 152 stores object data 560 associated with a plurality of objects. To illustrate, the object data 560 may include the first object data 562 and second object data 564.

The server 134 may generate image capture instructions 566 to be provided to the electronic device 102 based on information associated with the first object 586 that is included in the first image data 512. The electronic device 102 may receive the object recognition model update information 570 from the server 134 (via the network interface 110) and may store at least a portion of the object recognition model update information 570 in the memory 106. The electronic device 102 may update the first object recognition model 518 based on the object recognition model update information 570 to generate a second object recognition model 582.

The electronic device 102 may perform a second object recognition operation based on the second object recognition model 582. In the particular embodiment illustrated in FIG. 5, the camera 108 may capture information associated with a second scene 588 and provide the information as second image data 596 to the second object recognition model 582. The second object recognition operation may be performed on the second image data 596 captured by the camera 108. As an example, the second object recognition model 582 may identify the second object 590 in the second scene 588.

The electronic device 102 may send the second image data 596 (including information associated with the second object 590) to the server 134. The server 134 may determine location information 598 to be provided to the electronic device 102 based on information associated with the first object 586 and based on information associated with the second object 590. As an illustrative, non-limiting example, the server 134 may provide location information 598 to the electronic device 102 based on the location of the first building with respect to the second building. Such location information may be used by the server 134 to more accurately determine a particular location (e.g., a city, a street address, a neighborhood) and provide image data that is contextually relevant for image recognition operations at the particular location.

Figure 6:
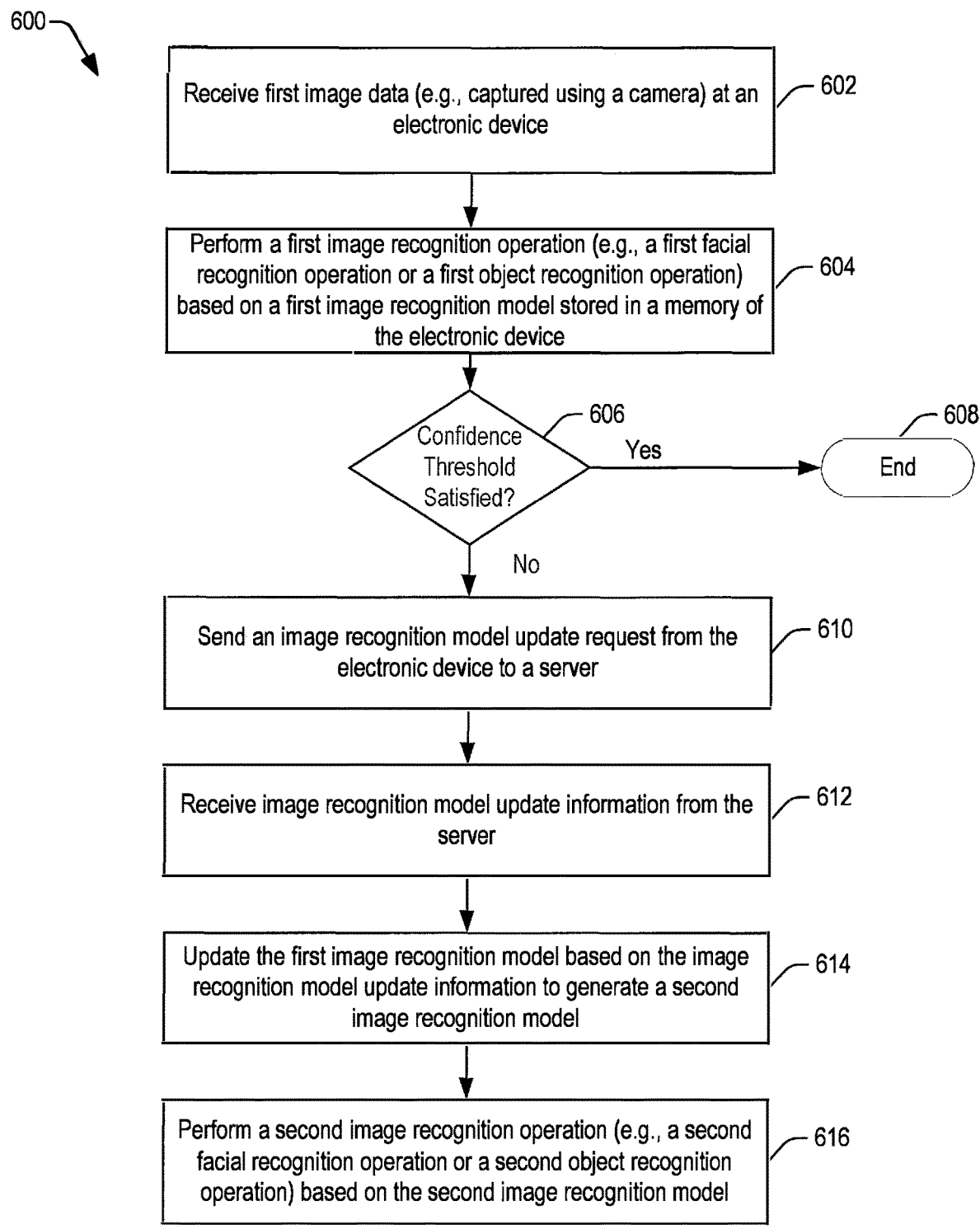
FIG. 6 is a flow diagram that illustrates a particular embodiment of a method for sending an image recognition model update request from an electronic device to a server and updating an image recognition model stored at the electronic device based on image recognition model update information received from the server.

FIG. 6 illustrates a particular embodiment of a method 600 for updating an image recognition model based on image recognition model update information received from a server responsive to a determination that a result of a first image recognition operation fails to satisfy a confidence threshold. In FIG. 6, an electronic device may send an image recognition model update request to a server and may update an image recognition model stored at the electronic device based on image recognition model update information received from the server.

The method 600 includes receiving first image data (e.g., captured using a camera) at an electronic device, at 602. For example, referring to FIGS. 1-3, the camera 108 of the electronic device 102 may capture the image data 112. In the example of FIG. 1, the image data 112 may include the image of the scene 184 (e.g., at a first location) that includes the first face 186, the second face 188, the first object 190, and the second object 192. In the example of FIG. 2, the image data 112 may include the image of the scene 284 (e.g., at a second location) that includes the third face 286 and the fourth face 288. In the example of FIG. 3, the image data 112 may include the image of the scene 384 (e.g., at a third location) that includes the first object 386, the second object 388, and the third object 390.

The method 600 includes performing a first image recognition operation (e.g., a first facial recognition operation, a first object recognition operation, or a combination thereof) based on a first image recognition model stored in a memory of the electronic device, at 604. For example, referring to FIGS. 1-3, the electronic device 102 may perform a first facial recognition operation based on the first image recognition model 116 stored in the memory 106. As another example, referring to FIGS. 1-3, the electronic device 102 may perform a first object recognition operation based on the first object recognition model 118 stored in the memory 106.

The method 600 includes determining whether a result (e.g., a confidence value) of the first image recognition operation satisfies a confidence threshold, at 606. For example, referring to FIG. 1, the electronic device 102 may determine whether a result of the first facial recognition operation (based on the first facial recognition model 116 and based on the first data 122) satisfies the confidence threshold 130. As another example, referring to FIG. 1, the electronic device 102 may determine whether a result of the first object recognition operation (based on the first object recognition model 118 and based on the first data 122) satisfies the confidence threshold 130. As a further example, referring to FIG. 2, the electronic device 102 may determine whether a result of the first facial recognition operation (based on the first facial recognition model 116 and the first set of faces of the image data 220) satisfies the confidence threshold 230. As another example, referring to FIG. 3, the electronic device 102 may determine whether a result of the first object recognition operation (based on the first object recognition model 118 and based on the first set of objects of the image data 320) satisfies the confidence threshold 330.

In response to determining that the result of the first image recognition operation satisfies the confidence threshold, the method 600 ends, at 608. For example, referring to FIG. 1, the first face 186 may represent a face that is recognized based on a result of performing a facial recognition operation based on the first facial recognition model 116 (and based on the first set of faces of the first data 122). As another example, referring to FIG. 1, the first object 190 and the second object 192 may represent objects that are recognized based on a result of performing an object recognition operation based on the first object recognition model 118 (and based on the first set of objects of the first data 122). In either case, the electronic device 102 may refrain from sending the image recognition model update request 132 to the server 134.

In response to determining that the result of the first image recognition operation fails to satisfy the confidence threshold, the method 600 includes sending an image recognition model update request from the electronic device to a server, at 610. For example, referring to FIG. 1, the electronic device 102 may determine that a result of the first facial recognition operation (performed based on the first facial recognition model 116 and the first set of faces of the first data 122) fails to satisfy the confidence threshold 130. In this case, the electronic device 102 may send the image recognition model update request 132 to the server 134 (via the network interface 110). As another example, the electronic device 102 may determine that a result of the first object recognition operation (performed based on the first object recognition model 118 and the first set of objects of the first data 122) fails to satisfy the confidence threshold 130. In either case, the electronic device 102 may send the image recognition model update request 132 to the server 134 (via the network interface 110). As a further example, referring to FIG. 2, the electronic device 102 may determine that a result of the first facial recognition operation (performed based on the first facial recognition model 116 and the first set of faces of the image data 220) fails to satisfy the confidence threshold 230. In this case, the electronic device 102 may send the facial recognition model update request 232 to the server 134. As another example, referring to FIG. 3, the electronic device 102 may determine that a result of the first object recognition operation (performed based on the first object recognition model 118 and the first set of objects of the image data 320) fails to satisfy the confidence threshold 330. In this case, the electronic device 102 may send the object recognition model update request 332 to the server 134.

The method 600 includes receiving image recognition model update information from the server, at 612. For example, referring to FIG. 1, the electronic device 102 may receive the image recognition model update information 170 from the server 134. As another example, referring to FIG. 2, the electronic device 102 may receive the facial recognition model update information 270 from the server 134. As a further example, referring to FIG. 3, the electronic device 102 may receive the object recognition model update information 370 from the server 134.

The method 600 includes updating the first image recognition model based on the image recognition model update information to generate a second image recognition model, at 614. For example, referring to FIG. 1, the electronic device 102 may update the first facial recognition model 116 and/or the first object recognition model 118 based on the image recognition model update information 170 to generate the second facial recognition model 180 and/or the second object recognition model 182. As another example, referring to FIG. 2, the electronic device 102 may update the first facial recognition model 116 based on the facial recognition model update information 270 to generate the second facial recognition model 280. As a further example, referring to FIG. 3, the electronic device 102 may update the first object recognition model 118 based on the object recognition model update information 370 to generate the second object recognition model 382.

The method 600 includes performing a second image recognition operation (e.g., a second facial recognition operation or a second object recognition operation) based on the second image recognition model, at 616. For example, referring to FIG. 1, the electronic device 102 may perform a second facial recognition operation and/or a second object recognition operation based on the second facial recognition model 180 and/or the second object recognition model 182. As another example, referring to FIG. 2, the electronic device 102 may perform a second facial recognition operation based on the second facial recognition model 280. As a further example, referring to FIG. 3, the electronic device 102 may perform a second object recognition operation based on the second object recognition model 382.

Figure 7:
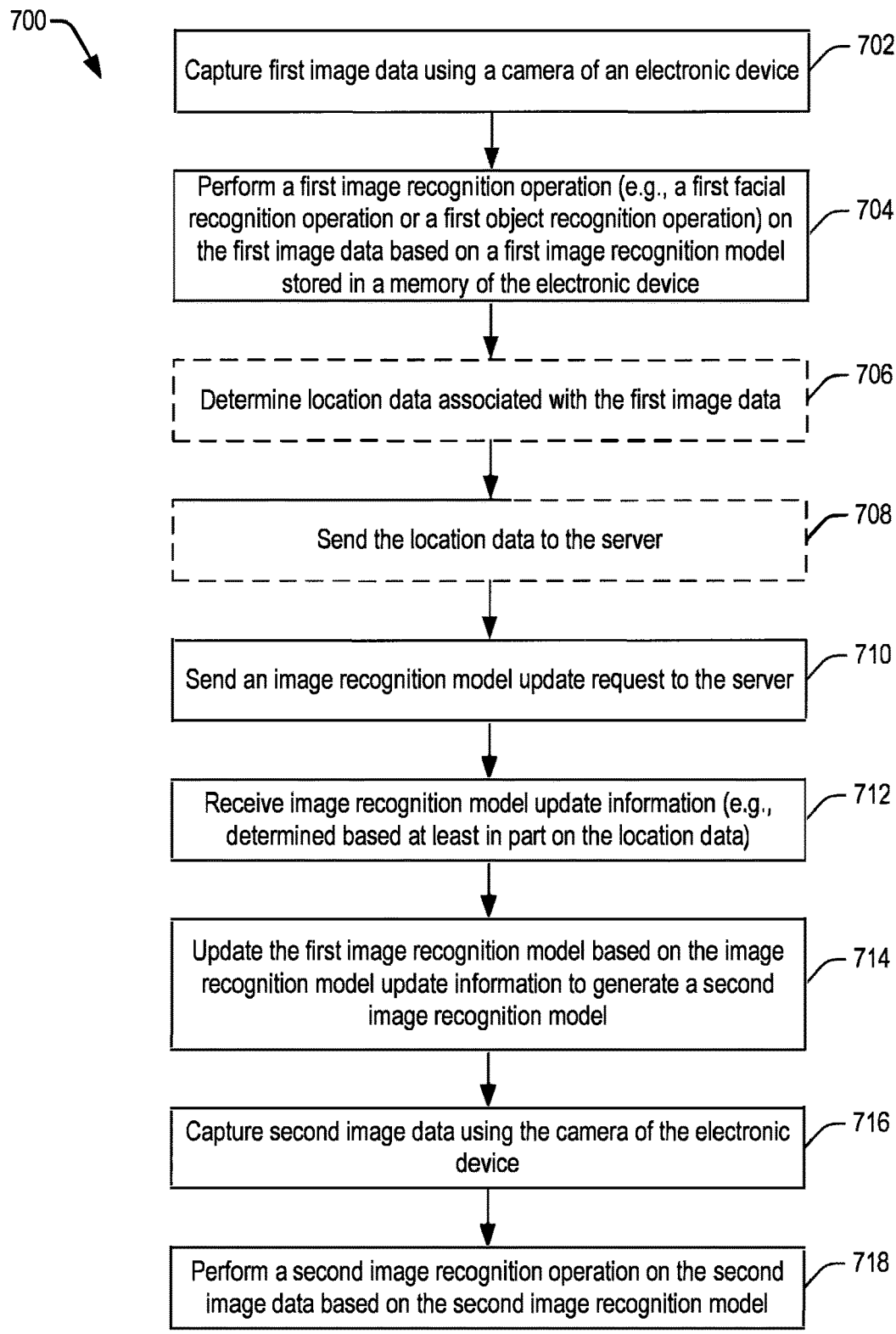
FIG. 7 is a flow diagram that illustrates a particular embodiment of a method for sending an image recognition model update request from an electronic device to a server and updating an image recognition model stored at the electronic device based on image recognition model update information received from the server.

FIG. 7 illustrates a particular embodiment of a method 700 for sending an image recognition model update request from an electronic device to a server and updating an image recognition model stored at the electronic device based on image recognition model update information received from the server. In FIG. 7, the electronic device may update the image recognition model based on the image recognition model update information received from the server and may perform a second image recognition operation on second image data captured by a camera based on the updated image recognition model.

The method 700 includes capturing first image data using a camera of an electronic device, at 702. For example, referring to FIG. 4, the camera 108 of the electronic device 102 may capture the first image data 112. The method 700 includes performing a first image recognition operation (e.g., a first facial recognition operation or a first object recognition operation) based on a first image recognition model stored in a memory of the electronic device, at 704. For example, referring to FIG. 4, the electronic device 102 may perform a first object recognition operation based on the first object recognition model 118 stored in the memory 106.

In the particular embodiment illustrated in FIG. 7, the method 700 includes determining location data associated with the first image data, at 706. For example, referring to FIG. 4, the electronic device 102 may determine the location data 494 associated with the first image data 112. FIG. 7 further illustrates that the method 700 may include sending the location data to the server, at 708. For example, referring to FIG. 4, the electronic device 102 may send the location data 494 to the server 134 (via the network interface 110).

The method 700 further includes sending an image recognition model update request to the server, at 710. For example, referring to FIG. 4, the electronic device 102 may send the object recognition model update request 432 to the server 134 (via the network interface 110). The method 700 includes receiving image recognition model update information from the server, at 712. The image recognition model update information may be determined based at least in part on the location data. For example, referring to FIG. 4, the object recognition model update module 144 of the server 134 may determine the object recognition model update information 470 based at least in part on the location data 494 (e.g., based on information stored in the location database 154). The electronic device 102 may receive the object recognition model update information 470 from the server 134.

The method 700 includes updating the first image recognition model based on the image recognition model update information to generate a second image recognition model, at 714. For example, referring to FIG. 4, the electronic device 102 may update the first object recognition model 118 based on the object recognition model update information 470. The method 700 includes capturing second image data using the camera of the electronic device, at 716. For example, referring to FIG. 4, the camera 108 of the electronic device 102 may capture the second image data 498. The method 700 includes performing a second image recognition operation on the second image data based on the second image recognition model, at 718. For example, referring to FIG. 4, the electronic device 102 may perform a second object recognition operation on the second image data 498 based on the second object recognition model 482.

Figure 8:
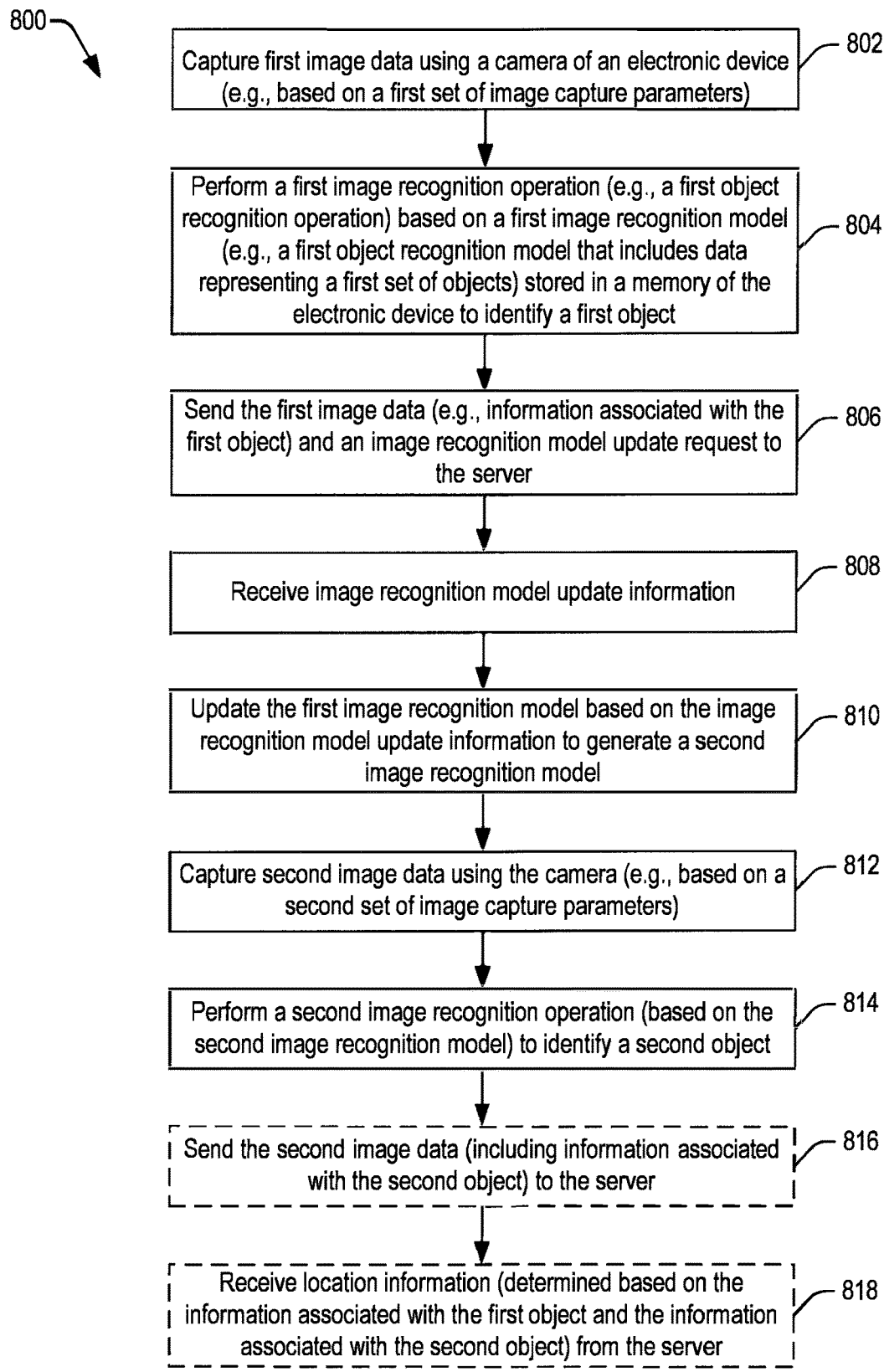
FIG. 8 is a flow diagram that illustrates a particular embodiment a method for sending an image recognition model update request from an electronic device to a server and updating an image recognition model stored at the electronic device based on image recognition model update information received from the server.

FIG. 8 illustrates a particular embodiment of a method 800 for sending an image recognition model update request from an electronic device to a server and updating an image recognition model stored at the electronic device based on image recognition model update information received from the server. In FIG. 8, the electronic device may send first image data to the server that is captured based on first image capture parameters, and the electronic device may send second image data to the server that is captured based on second image capture parameters. The server may provide location information to the electronic device based on information associated with an object identified in the first image data and based on information associated with an object identified in the second image data.

The method 800 includes capturing first image data using a camera of an electronic device, at 802. The camera may capture the first image data based on a first set of image capture parameters. For example, referring to FIG. 8, the camera 108 of the electronic device 102 may capture the first image data 112 based on a first set of image capture parameters. In the example of FIG. 8, the camera 108 may capture data associated with a first scene 584 that includes the first object 586 (e.g., a narrow view).

The method 800 includes performing a first image recognition operation based on a first image recognition model stored in a memory of the electronic device to identify a first object, at 804. The first object may be identified by performing a first object recognition operation based on a first object recognition model that includes data representing a first set of objects. For example, referring to FIG. 8, the electronic device 102 may perform a first object recognition operation based on the first object recognition model 118 stored in the memory 106 to identify the first object 586. In the example of FIG. 8, the first object 586 may be identified by performing the first object recognition operation based on the image data 520 that includes data representing a first set of objects (e.g., the first object data 522).

The method 800 includes sending the first image data and an image recognition model update request to the server, at 806. The first image data may include information associated with the first object. For example, referring to FIG. 5, the electronic device 102 may send the first image data 112 and the object recognition model update request 532 to the server 134 (via the network interface 110). The first image data 112 may be associated with the first object 586.

The method 800 includes receiving image recognition model update information, at 808. For example, referring to FIG. 5, the electronic device 102 may receive the object recognition model update information 570 (that includes the second object data 572). The method 800 includes updating the first image recognition model based on the image recognition model update information to generate a second image recognition model, at 810. For example, referring to FIG. 5, the electronic device 102 may update the first object recognition model 118 based on the object recognition model update information 570 to generate the second object recognition model 582.

The method 800 includes capturing second image data using the camera, at 812. The second image data may be captured based on a second set of image capture parameters. For example, referring to FIG. 5, the camera 108 of the electronic device 102 may capture the second image data 596 based on a second set of image capture parameters. In the example of FIG. 8, the camera 108 may capture data associated with a second scene 588 that includes the second object 590 (e.g., a wide view). The second set of image capture parameters may be determined based on the image capture instructions 566 received from the server 134.

The method 800 includes performing a second image recognition operation (based on the second image recognition model) to identify a second object, at 814. For example, referring to FIG. 5, the electronic device 102 may perform a second object recognition operation (based on the second object recognition model 582) to identify the second object 590. In the particular embodiment illustrated in FIG. 8, the method 800 includes sending the second image data (including information associated with the second object) to the server, at 816. For example, referring to FIG. 5, the electronic device 102 may send the second image data 596 to the server 134.

FIG. 8 further illustrates that the method 800 may include receiving location information from the server, at 818. The location information may be determined based on the information associated with the first object and based on the information associated with the second object. For example, referring to FIG. 5, the server 134 may determine the location information 598 based on the information associated with the first object 586 and based on the information associated with the second object 590. To illustrate, the server 134 may query the location database 154 to determine the location information 598.

Figure 9:
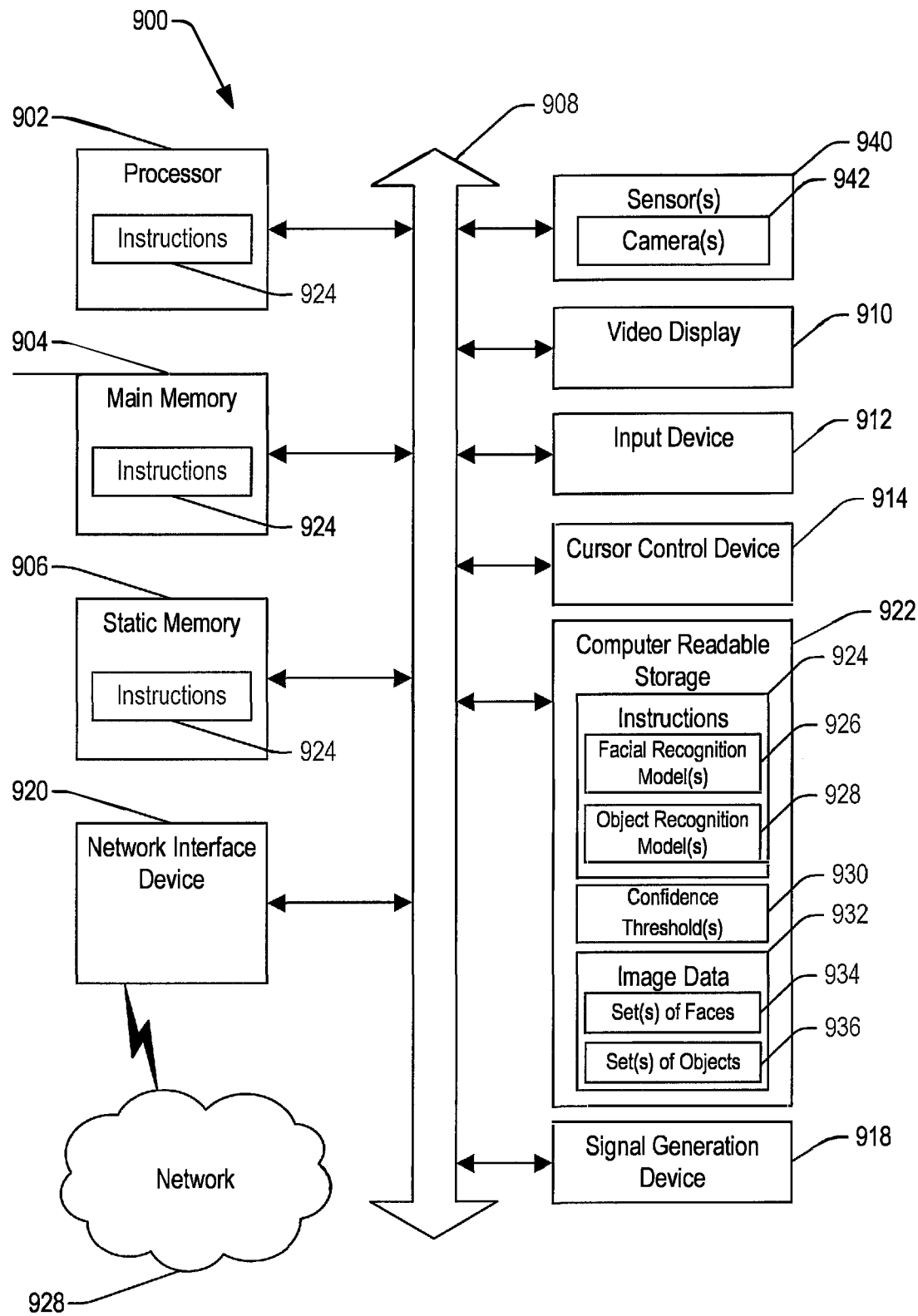
FIG. 9 is a block diagram of an illustrative embodiment of a general computer system.

Referring to FIG. 9, an illustrative embodiment of a general computer system is shown and is designated 900. The computer system 900 includes a set of instructions that can be executed to cause the computer system 900 to perform any one or more of the methods or computer-based functions disclosed herein. The computer system 900 may operate as a standalone device or may be connected, e.g., using a network, to other computer systems or peripheral devices. For example, the computer system 900 may include or be included within any one or more of the electronic device 102, the server(s) 134, or combinations thereof described with reference to FIGS. 1-5.

In a networked deployment, the computer system 900 may operate in the capacity of a server or as a client user computer in a server-client user network environment, or as a peer computer system in a peer-to-peer (or distributed) network environment. The computer system 900 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular embodiment, the computer system 900 may be implemented using electronic devices that provide video, audio, or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. For example, the processor 902 may include or correspond to the processor 104 illustrated in FIGS. 1-5. As another example, when the computer system 900 corresponds to a server, the processor 902 may include or correspond to the processor(s) 138 of the server(s) 134 illustrated in FIGS. 1-5. Moreover, the computer system 900 may include a main memory 904 and a static memory 906, which can communicate with each other via a bus 908. For example, the main memory 904 may include or correspond to the memory 106 of the electronic device 102 illustrated in FIGS. 1-5. As another example, when the computer system 900 corresponds to a server, main memory 904 may include or correspond to the memory 140 of the server(s) 134 illustrated in FIGS. 1-5. As shown, the computer system 900 may further include a video display unit 910, such as a liquid crystal display (LCD), a light emitting diode (LED) display, a touch screen display, a flat panel display, or a solid-state display. Additionally, the computer system 900 may include an input device 912, such as a remote-control device or a keyboard, and a cursor control device 914, such as a mouse. In some embodiments, the input device 912 and the cursor control device 914 may be integrated into a single device, such as a capacitive touch screen input device. The computer system 900 may also include a signal generation device 918, such as a speaker, and a network interface device 920. Some computer systems 900 may not include an input device (e.g., a server may not include an input device). To illustrate, when the computer system 900 corresponds to the server(s) 134 illustrated in FIGS. 1-5, the computer system 900 not include an input device.

In a particular embodiment, as depicted in FIG. 9, the device 900 may include computer-readable storage 922 in which one or more sets of instructions 924, e.g., software, can be embedded. The computer-readable storage 922 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 924 may embody one or more of the methods or logic as described herein. When the device 900 corresponds to an electronic device, FIG. 9 illustrates that the instructions 924 may include one or more facial recognition models 926 and/or one or more object recognition models 928. The instructions 924 may be executable by the processor 902 to perform one or more functions or methods described herein, such as the methods 600, 700, or 800 described with reference to FIG. 6, 7, or 8, respectively. In a particular embodiment, the instructions 924 may reside completely, or at least partially, within the main memory 904, the static memory 906, and/or within the processor 902 during execution by the computer system 900. The main memory 904 and the processor 902 also may include a computer-readable storage device.

FIG. 9 illustrates a particular embodiment in which the computer system 900 may correspond to an electronic device, and the computer-readable storage 922 may include one or more confidence thresholds 932 and image data 932. For example, the confidence threshold(s) 932 may correspond to the confidence threshold(s) 130 of the FIG. 1, the confidence threshold(s) 230 of FIG. 2, the confidence threshold(s) 330 of FIG. 3, the confidence threshold(s) 430 of FIG. 4, the confidence threshold(s) 530 of FIG. 5, or any combination thereof. FIG. 9 further illustrates that the image data 932 may include data associated with one or more sets of faces 934 and/or data associated with one or more sets of objects 936. To illustrate, the image data 932 may correspond to the image data 120 of FIG. 1, the image data 220 of FIG. 2, the image data 320 of FIG. 3, the image data 420 of FIG. 4, the image data 520 of FIG. 5, or any combination thereof.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine, or other suitable device for executing instructions to perform operations may perform such operations directly or indirectly by way of one or more intermediate devices directed by the computing device.

The present disclosure includes computer-readable storage 922 that stores instructions 924, so that a device connected to a network 928 may communicate voice, video, or data over the network 928. While the computer-readable storage 922 is shown to be a single device, the computer-readable storage 922 may include a single device or multiple devices, such as a centralized or distributed database, and/or associated caches and servers that store one or more sets of instructions. The computer-readable storage 922 is capable of storing a set of instructions for execution by a processor to cause a computer system to perform any one or more of the methods or operations disclosed herein. For example, the computer-readable storage 922 may store instructions for execution by a processor to cause a computer system to perform any one or more of the methods 600, 700, or 800 described with reference to FIG. 6, 7, or 8, respectively.

In a particular non-limiting, exemplary embodiment, the computer-readable storage 922 may include a solid-state memory such as embedded memory (or a memory card or other package that houses one or more non-volatile read-only memories). Further, the computer-readable storage 922 may be a random-access memory or other volatile rewritable memory. Additionally, the computer-readable storage 922 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 900 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step, or function, such as first, second, third, and so forth, is not intended to describe an order unless expressly stated. The use of the terms first, second, third and so forth, is generally to distinguish between devices, components, steps, or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A non-transitory, machine-readable medium, comprising executable instructions that, when executed by a processing system of a mobile device including a processor, facilitate performance of operations, the operations comprising:
   receiving first image data for a first image from an electronic device, the first image data including first information associated with a first object identified by the electronic device, using a first image recognition operation, as being in the first image;
   receiving second image data for a second image from the electronic device subsequent to receiving the first image data, the second image data including second information associated with a second object identified by the electronic device as being in the second image;
   determining location information based on the first information and the second information;
   sending the location information and update model information based on the first image and the location information, responsive to receiving model update request, to the electronic device,
   wherein the update model information includes image data to replace model information used by the electronic device to identify the first object, the second object, or both, and
   wherein the model update request is received from the electronic device, when it is determined by the electronic device that a confidence value of the first image recognition operation fails to satisfy a confidence threshold.

2. The non-transitory, machine-readable storage medium of claim 1, wherein the operations further comprise:
   determining image capture instructions for the second image; and
   sending the image capture instructions to the electronic device.

3. The non-transitory, machine-readable storage medium of claim 2,
   wherein the image capture instructions enable the electronic device to prompt a user of the electronic device to change an image capture property of a camera used to take the first image.

4. The non-transitory, machine-readable storage medium of claim 3, wherein the image capture property corresponds to a view width of the first object.

5. The non-transitory, machine-readable storage medium of claim 2, wherein the image capture instructions cause the electronic device to automatically change a first set of image capture parameters to a second set of image capture parameters.

6. The non-transitory, machine-readable storage medium of claim 5, wherein the first set of image capture parameters correspond to a narrow view of a particular subject, and wherein the second set of image capture parameters correspond to a wide view of the particular subject.

7. A mobile device, comprising:
- a processing system including a processor; and
- a memory that stores executable instructions that, when executed by the processing system, facilitate performance of operations, the operations including:
  - obtaining first image data for a first image from an electronic device, the first image data including first information associated with a first object identified by the electronic device, using a first image recognition operation, as being in the first image;
  - obtaining second image data for a second image from the electronic device subsequent to receiving the first image data, the second image data including second information associated with a second object identified by the electronic device as being in the second image;
  - determining location information based on the first information and the second information; and
  - providing the location information and update model information based on the first image and the location information, responsive to receiving model update request, to the electronic device,
  - wherein the update model information includes image data to replace model information used by the electronic device to identify the first object, the second object, or both, and
  - wherein the model update request is received from the electronic device, when it is determined by the electronic device that a confidence value of the first image recognition operation fails to satisfy a confidence threshold.

8. The mobile device of claim 7, wherein the operations further comprise:
- determining image capture instructions for the second image; and
- sending the image capture instructions to the electronic device.

9. The mobile device of claim 8, wherein the image capture instructions enable the electronic device to prompt a user of the electronic device to change an image capture property of a camera used to take the first image.

10. The mobile device of claim 7, wherein the operations further comprise:
sending update model information to the electronic device based on the first image responsive to receiving the first image data, the update model information including image data to replace module information used by the electronic device to identify the first object.

11. A method, comprising:
obtaining, by a processing system including a processor, first image data for a first image from an electronic device, the first image data including first information associated with a first object identified by the electronic device, using a first image recognition operation, as being in the first image;
obtaining, by the processing system, second image data for a second image from the electronic device subsequent to receiving the first image data, the second image data including second information associated with a second object identified by the electronic device as being in the second image;
identifying, by the processing system, location information based on the first information and the second information; and
providing, by the processing system, the location information and update model information based on the first image and the location information, responsive to receiving model update request to the electronic device,
wherein the update model information includes image data to replace model information used by the electronic device to identify the first object, the second object, or both, and
wherein the model update request is received from the electronic device, when it is determined by the electronic device that a confidence value of the first image recognition operation fails to satisfy a confidence threshold.

12. The method of claim 11, further comprising:
determining, by the processing system, image capture instructions for the second image; and
sending, by the processing system, the image capture instructions to the electronic device.

13. The method of claim 12, wherein the image capture instructions further enable the electronic device to prompt a user of the electronic device to change an image capture property of a camera used to take the first image.

* * * * *